(12) United States Patent
Liu et al.

(10) Patent No.: US 11,395,317 B2
(45) Date of Patent: Jul. 19, 2022

(54) INFORMATION SENDING AND RECEIVING METHOD, AND INFORMATION SENDING AND RECEIVING APPARATUS

(71) Applicant: Huawei Technologies Co., Ltd., Shenzhen (CN)

(72) Inventors: Yun Liu, Shenzhen (CN); Jian Wang, Beijing (CN); Da Wang, Shenzhen (CN); Yifan Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 109 days.

(21) Appl. No.: 16/764,717

(22) PCT Filed: Nov. 15, 2018

(86) PCT No.: PCT/CN2018/115547
§ 371 (c)(1),
(2) Date: May 15, 2020

(87) PCT Pub. No.: WO2019/096187
PCT Pub. Date: May 23, 2019

(65) Prior Publication Data
US 2020/0374902 A1 Nov. 26, 2020

(30) Foreign Application Priority Data
Nov. 16, 2017 (CN) .......................... 201711140777.8

(51) Int. Cl.
H04J 3/00 (2006.01)
H04W 72/12 (2009.01)
(Continued)

(52) U.S. Cl.
CPC ........... H04W 72/1268 (2013.01); H04L 5/14 (2013.01); H04W 72/0413 (2013.01)

(58) Field of Classification Search
CPC ............... H04L 5/0053; H04L 5/0055; H04W 72/0446; H04W 72/0413
See application file for complete search history.

(56) References Cited

U.S. PATENT DOCUMENTS

2013/0022019 A1    1/2013 Han et al.
2017/0150499 A1    5/2017 Kim et al.
(Continued)

FOREIGN PATENT DOCUMENTS

CN    102625457 A    8/2012
CN    104754742 A    7/2015
(Continued)

OTHER PUBLICATIONS

R1-1717311, Huawei, et al., "General considerations on UL power control design," 3GPP TSG RAN WG1 Meeting 90bis, Prague, Czech Republic, Oct. 9-13, 2017, 8 pages.
R1-1718811, Ericsson, "On PUCCH Resource Allocation," 3GPP TSG RAN WG1 Meeting#90bis, Prague, Czech Republic, Oct. 9-13, 2017, 12 pages.
(Continued)

Primary Examiner — Bo Hui A Zhu
(74) Attorney, Agent, or Firm — Conley Rose, P.C.

(57) ABSTRACT

This application provides an information sending and receiving method and an information sending and receiving apparatus, to improve flexibility of sending information carried on a PUCCH. The method includes: determining, by a terminal, $m_i$ uplink symbols in the $i^{th}$ slot; and sending, by the terminal on the $m_i$ uplink symbols, information carried on a first PUCCH in the $k^{th}$ slot, where the $k^{th}$ slot is the $k^{th}$ slot in K slots used to transmit information carried on first PUCCHs, a value of $m_i$ is the same as a quantity of symbols occupied by the first PUCCH in the $k^{th}$ slot, K is an integer greater than 1, k is an integer greater than 1 and less than or equal to K, $m_i$ is an integer greater than 0, and i is an integer greater than 0. This application relates to the field of communications technologies.

20 Claims, 10 Drawing Sheets

(51) Int. Cl.
*H04L 5/14* (2006.01)
*H04W 72/04* (2009.01)

(56) References Cited

U.S. PATENT DOCUMENTS

| | | | |
|---|---|---|---|
| 2017/0367046 A1* | 12/2017 | Papasakellariou | H04W 72/0453 |
| 2018/0279295 A1 | 9/2018 | Gao et al. | |
| 2019/0029046 A1 | 1/2019 | Li et al. | |
| 2020/0092059 A1* | 3/2020 | Zhu | H04L 27/2613 |
| 2020/0275471 A1* | 8/2020 | Gou | H04L 27/2601 |
| 2021/0195582 A1* | 6/2021 | Takano | H04W 72/0413 |

FOREIGN PATENT DOCUMENTS

| | | |
|---|---|---|
| CN | 105743627 A | 7/2016 |
| CN | 106559198 A | 4/2017 |
| CN | 106664193 A | 5/2017 |
| CN | 106992847 A | 7/2017 |
| WO | 2017075770 A1 | 5/2017 |

OTHER PUBLICATIONS

R1-1704910, LG Electronics, "Resource configuration for long NR-PUCCH," 3GPP TSG RAN WG1 Meeting #88bis, Spokane, USA, Apr. 3-7, 2017, 5 pages.

R1-1715514, Spreadtrum Communications, "Support of long-PUCCH transmission over multiple slots," 3GPP TSG RAN WG1 Meeting NR#3, Nagoya, Japan, Sep. 18-21, 2017, 4 pages.

R1-1715993, Samsung, "Multi-Slot Long PUCCH Transmission," 3GPP TSG RAN WG1 Meeting NR#3, Nagoya, Japan, Sep. 18-21, 2017, 4 pages.

R1-1717071, Huawei, et al., "Support of long-PUCCH over multiple slots," 3GPP TSG RAN WG1 Meeting#90bis, Prague, Czech Republic, Oct. 9-13, 2017, 6 pages.

R1-1717653, Samsung, "Multi-Slot Long PUCCH Transmission," 3GPP TSG RAN WG1 Meeting #90b, Prague, CZ, Oct. 9-13, 2017, 5 pages.

Guangdong Oppo Mobile Telecom, "Slot aggregation and configuration for NR long PUCCH," 3GPP TSG RAN WG1 meeting #88bis, Spokane, Washington, USA, R1-1704623, Apr. 3-7, 2017, 5 pages.

* cited by examiner

INFORMATION SENDING AND RECEIVING METHOD, AND INFORMATION SENDING AND RECEIVING APPARATUS

CROSS-REFERENCE TO RELATED APPLICATIONS

This application is a National Stage of International Patent Application No. PCT/CN2018/115547 filed on Nov. 15, 2018, which claims priority to Chinese Patent Application No. 201711140777.8 filed on Nov. 16, 2017. Both of the aforementioned applications are hereby incorporated by reference in their entireties.

TECHNICAL FIELD

This application relates to the field of communications technologies, and in particular, to an information sending and receiving method and an information sending and receiving apparatus.

BACKGROUND

In an existing long term evolution (long term evolution, LTE for short) system, there is a design of transmitting information carried on a physical uplink control channel (physical uplink control channel, PUCCH for short) in a plurality of subframes. Specifically, a base station may configure, by using higher layer signaling, a quantity of slots used to transmit the information carried on the PUCCH, and schedule, in an uplink subframe, a terminal to send the PUCCH. In the LTE system, the information carried on the PUCCH can be transmitted only in the uplink subframe, and all symbols in the uplink subframe are uplink symbols. In other words, all the symbols in the uplink subframe are used to transmit the information carried on the PUCCH.

In a fifth generation (fifth-generation, 5G for short) wireless communications system, one slot may include an uplink symbol, and may further include a downlink symbol. Therefore, some symbols in one slot are used to transmit information carried on a PUCCH. In an implementation, the information carried on the PUCCH is transmitted on a plurality of fixed symbols in each slot. Because a symbol that is in the slot and that is used to transmit the information carried on the PUCCH has a fixed location, the information carried on the PUCCH cannot be flexibly sent.

SUMMARY

Embodiments of this application provide an information sending and receiving method and an information sending and receiving apparatus, to improve flexibility of sending information carried on a PUCCH.

To achieve the foregoing objective, the embodiments of this application provide the following technical solutions.

According to a first aspect, an information sending method is provided, including: determining, by a terminal, $m_i$ uplink symbols in the $i^{th}$ slot; and sending, by the terminal on the $m_i$ uplink symbols, information carried on a first PUCCH in the $k^{th}$ slot, where the $k^{th}$ slot is the $k^{th}$ slot in K slots used to transmit information carried on first PUCCHs, that is, the $k^{th}$ slot is the $k^{th}$ slot in the K slots used to transmit the first PUCCHs, a value of $m_i$ is the same as a quantity of symbols occupied by the first PUCCH in the $k^{th}$ slot, K is an integer greater than 1, k is an integer greater than 1 and less than or equal to K, $m_i$ is an integer greater than 0, and i is an integer greater than 0. Herein, $m_i$ may be an integer greater than 3. In other words, the first PUCCH may be a long duration PUCCH. According to the method provided in the first aspect, the terminal may determine, based on a preset rule, an uplink symbol used to transmit the first PUCCH, namely, an uplink symbol used to transmit the information carried on the first PUCCH, and does not transmit, on a fixed uplink symbol, the information carried on the first PUCCH. Therefore, flexibility of transmitting the information carried on the first PUCCH can be improved.

In a possible design, i is an integer greater than or equal to k.

In a possible design, the value of $m_i$ is less than 13.

In a possible design, same information is carried on the first PUCCHs in the K slots.

In a possible design, the $m_i$ uplink symbols are $m_i$ consecutive uplink symbols.

In a possible design, the first uplink symbol in the $m_i$ uplink symbols is the $x_1^{th}$ uplink symbol in uplink symbols in the $i^{th}$ slot; or the last uplink symbol in the $m_i$ uplink symbols is the last-but-$(y_1-1)$ uplink symbol in uplink symbols in the $i^{th}$ slot, and both $x_1$ and $y_1$ are integers greater than 0. Optionally, when both $x_1$ and $y_1$ are greater than 1, the first $x_1-1$ symbols in the uplink symbols in the $i^{th}$ slot include a symbol used to send an SRS and/or a second PUCCH, and the last $y_1-1$ symbols in the uplink symbols in the $i^{th}$ slot include a symbol used to send the SRS and/or the second PUCCH.

In a possible design, k is equal to K, and the first uplink symbol in the $m_i$ uplink symbols is the first uplink symbol in uplink symbols in the $i^{th}$ slot. This possible implementation helps a base station to earlier complete receiving of the information carried on the first PUCCH. Therefore, a delay can be reduced.

In a possible design, k>2. If the last uplink symbol in $m_{(i-r)}$ uplink symbols in the $(i-r)^{th}$ slot is the last uplink symbol in uplink symbols in the $(i-r)^{th}$ slot, the first uplink symbol in the $m_i$ uplink symbols is the first uplink symbol in uplink symbols in the $i^{th}$ slot; or if the first uplink symbol in $m_{(i-r)}$ uplink symbols in the $(i-r)^{th}$ slot is the first uplink symbol in uplink symbols in the $(i-r)^{th}$ slot, the last uplink symbol in the $m_i$ uplink symbols is the last uplink symbol in uplink symbols in the $i^{th}$ slot; the $m_{(i-r)}$ uplink symbols are used to transmit information carried on a first PUCCH in the $(k-1)^{th}$ slot; the $(k-1)^{th}$ slot is the $(k-1)^{th}$ slot in the K slots used to transmit the information carried on the first PUCCHs; $m_{(i-r)}$ is an integer greater than 0; r is an integer greater than 0; and i-r is an integer greater than 0. In this possible implementation, when the $m_{(i-r)}$ uplink symbols are relatively close to the $m_i$ uplink symbols, a channel measurement result on the $m_{(i-r)}$ uplink symbols and a channel measurement result on the $m_i$ uplink symbols may be jointly used. Therefore, channel detection performance is improved.

In a possible design, the first PUCCH in the $k^{th}$ slot includes a first part and a second part, $m_{i1}$ uplink symbols in the $m_i$ uplink symbols are used to transmit the first part, $m_{i2}$ uplink symbols in the $m_i$ uplink symbols are used to transmit the second part, and both $m_{i1}$ and $m_{i2}$ are integers greater than 0 and less than $m_i$; and the first uplink symbol in the $m_{i1}$ uplink symbols is the first uplink symbol in uplink symbols in the $i^{th}$ slot, and the last uplink symbol in the $m_{i2}$ uplink symbols is the last uplink symbol in the uplink symbols in the $i^{th}$ slot; or the first uplink symbol in the $m_{i1}$ uplink symbols is the first uplink symbol in uplink symbols in the $i^{th}$ slot, the last uplink symbol in the $m_{i2}$ uplink symbols is the last-but-$(y_2-1)$ uplink symbol in the uplink symbols in the $i^{th}$ slot, $y_2$ is an integer greater than 1, and optionally, the last $y_2-1$ uplink symbols in the uplink symbols in the $i^{th}$ slot include an uplink symbol used to transmit an SRS and/or a second format PUCCH; or the first uplink symbol in the $m_{i1}$ uplink symbols is the $x_2^{th}$ uplink symbol in uplink symbols in the $i^{th}$ slot, the last uplink symbol in the $m_{i2}$ uplink symbols is the last uplink symbol in the uplink symbols in the $i^{th}$ slot, $x_2$ is an integer greater than 1, and optionally, the first $x_2-1$ uplink symbols in the uplink symbols in the $i^{th}$ slot include an uplink symbol used to transmit an SRS and/or a second format PUCCH; or the first uplink symbol in the $m_{i1}$ uplink symbols is the $x_3^{th}$ uplink symbol in uplink symbols in the $i^{th}$ slot, the last uplink symbol in the $m_{i2}$ uplink symbols is the last-but-$(y_3-1)$ uplink symbol in the uplink symbols in the $i^{th}$ slot, both $x_3$ and $y_3$ are integers greater than 1, and optionally, the first $x_3-1$ uplink symbols in the uplink symbols in the $i^{th}$ slot and the last $y_3-1$ uplink symbols in the uplink symbols in the $i^{th}$ slot include an uplink symbol used to transmit an SRS and/or a second format PUCCH.

According to a second aspect, an information receiving method is provided, including: determining, by a base station, $m_i$ uplink symbols in the $i^{th}$ slot; and receiving, by the base station on the $m_i$ uplink symbols, information carried on a first PUCCH in the $k^{th}$ slot, where the $k^{th}$ slot is the $k^{th}$ slot in K slots used to transmit information carried on first PUCCHs, that is, the $k^{th}$ slot is the $k^{th}$ slot in the K slots used to transmit the first PUCCHs, a value of $m_i$ is the same as a quantity of symbols occupied by the first PUCCH in the $k^{th}$ slot, K is an integer greater than 1, k is an integer greater than 1 and less than or equal to K, $m_i$ is an integer greater than 0, and i is an integer greater than 0. Herein, $m_i$ may be an integer greater than 3. In other words, the first PUCCH may be a long duration PUCCH. According to the method provided in the second aspect, the base station may determine, based on a preset rule, an uplink symbol used to transmit the first PUCCH, namely, an uplink symbol used to transmit the information carried on the first PUCCH, and does not transmit, on a fixed uplink symbol, the information carried on the first PUCCH. Therefore, flexibility of transmitting the information carried on the first PUCCH can be improved.

In a possible design, i is an integer greater than or equal to k.

In a possible design, the value of $m_i$ is less than 13.

In a possible design, same information is carried on the first PUCCHs in the K slots.

In a possible design, the $m_i$ uplink symbols are $m_i$ consecutive uplink symbols.

In a possible design, the first uplink symbol in the $m_i$ uplink symbols is the $x_1^{th}$ uplink symbol in uplink symbols in the $i^{th}$ slot; or the last uplink symbol in the $m_i$ uplink symbols is the last-but-$(y_1-1)$ uplink symbol in uplink symbols in the $i^{th}$ slot, and both $x_1$ and $y_1$ are integers greater than 0. Optionally, when both $x_1$ and $y_1$ are greater than 1, the first $x_1-1$ symbols in the uplink symbols in the $i^{th}$ slot include a symbol used to send an SRS and/or a second PUCCH, and the last $y_1-1$ symbols in the uplink symbols in the $i^{th}$ slot include a symbol used to send the SRS and/or the second PUCCH.

In a possible design, k is equal to K, and the first uplink symbol in the $m_i$ uplink symbols is the first uplink symbol in uplink symbols in the $i^{th}$ slot. This possible implementation helps a base station to earlier complete receiving of the information carried on the first PUCCH. Therefore, a delay can be reduced.

In a possible design, k>2. If the last uplink symbol in $m_{(i-r)}$ uplink symbols in the $(i-r)^{th}$ slot is the last uplink symbol in uplink symbols in the $(i-r)^{th}$ slot, the first uplink symbol in the $m_i$ uplink symbols is the first uplink symbol in uplink symbols in the $i^{th}$ slot; or if the first uplink symbol in $m_{(i-r)}$ uplink symbols in the $(i-r)^{th}$ slot is the first uplink symbol in uplink symbols in the $(i-r)^{th}$ slot, the last uplink symbol in the $m_i$ uplink symbols is the last uplink symbol in uplink symbols in the $i^{th}$ slot; the $m_{(i-r)}$ uplink symbols are used to transmit information carried on a first PUCCH in the $(k-1)^{th}$ slot; the $(k-1)^{th}$ slot is the $(k-1)^{th}$ slot in the K slots used to transmit the information carried on the first PUCCHs; $m_{(i-r)}$ is an integer greater than 0; r is an integer greater than 0; and i-r is an integer greater than 0. In this possible implementation, when the $m_{(i-r)}$ uplink symbols are relatively close to the $m_i$ uplink symbols, a channel measurement result on the $m_{(i-r)}$ uplink symbols and a channel measurement result on the $m_i$ uplink symbols may be jointly used. Therefore, channel detection performance is improved.

In a possible design, the first PUCCH in the $k^{th}$ slot includes a first part and a second part, $m_{i1}$ uplink symbols in the $m_i$ uplink symbols are used to transmit the first part, $m_{i2}$ uplink symbols in the $m_i$ uplink symbols are used to transmit the second part, and both $m_{i1}$ and $m_{i2}$ are integers greater than 0 and less than $m_i$; and the first uplink symbol in the $m_{i1}$ uplink symbols is the first uplink symbol in uplink symbols in the $i^{th}$ slot, and the last uplink symbol in the $m_{i2}$ uplink symbols is the last uplink symbol in the uplink symbols in the $i^{th}$ slot; or the first uplink symbol in the $m_{i1}$ uplink symbols is the first uplink symbol in uplink symbols in the $i^{th}$ slot, the last uplink symbol in the $m_{i2}$ uplink symbols is the last-but-$(y_2-1)$ uplink symbol in the uplink symbols in the $i^{th}$ slot, $y_2$ is an integer greater than 1, and optionally, the last $y_2-1$ uplink symbols in the uplink symbols in the $i^{th}$ slot include an uplink symbol used to transmit an SRS and/or a second format PUCCH; or the first uplink symbol in the $m_{i1}$ uplink symbols is the $x_2^{th}$ uplink symbol in uplink symbols in the $i^{th}$ slot, the last uplink symbol in the $m_{i2}$ uplink symbols is the last uplink symbol in the uplink symbols in the $i^{th}$ slot, $x_2$ is an integer greater than 1, and optionally, the first $x_2-1$ uplink symbols in the uplink symbols in the $i^{th}$ slot include an uplink symbol used to transmit an SRS and/or a second format PUCCH; or the first uplink symbol in the $m_{i1}$ uplink symbols is the $x_3^{th}$ uplink symbol in uplink symbols in the $i^{th}$ slot, the last uplink symbol in the $m_{i2}$ uplink symbols is the last-but-$(y_3-1)$ uplink symbol in the uplink symbols in the $i^{th}$ slot, both $x_3$ and $y_3$ are integers greater than 1, and optionally, the first $x_3-1$ uplink symbols in the uplink symbols in the $i^{th}$ slot and the last $y_3-1$ uplink symbols in the uplink symbols in the $i^{th}$ slot include an uplink symbol used to transmit an SRS and/or a second format PUCCH.

According to a third aspect, an information sending method is provided, including: receiving, by a terminal, at least one parameter of first PUCCHs from a base station, where the at least one parameter indicates a quantity K of slots used to transmit information carried on the first PUCCHs, the at least one parameter further indicates a quantity $m_k$ of symbols occupied by a first PUCCH in the $k^{th}$ slot in the K slots used to transmit the information carried on the first PUCCHs, K is an integer greater than 1, k is an integer greater than 1 and less than or equal to K, and $m_k$ is an integer greater than 0; and sending, by the terminal in the slot based on the at least one parameter of the first PUCCHs, information carried on the first PUCCH in the $k^{th}$ slot, where the $k^{th}$ slot is the $k^{th}$ slot in the K slots used to transmit the first PUCCHs, and a quantity of uplink symbols in the $i^{th}$ slot is greater than or equal to $m_k$. According to the method provided in the third aspect, the terminal may determine the at least one parameter of the first PUCCHs, and send, in the $i^{th}$ slot based on the at least one parameter, the information carried on the first PUCCH in the $k^{th}$ slot. The $i^{th}$ slot only needs to meet a condition that a quantity of uplink symbols in the $i^{th}$ slot is greater than or equal to $m_k$. Therefore, the terminal can transmit, in any slot that meets a condition that a quantity of uplink symbols in the slot is greater than or equal to $m_k$, the information carried on the first PUCCH, where the slot is used as the $k^{th}$ slot in the K slots, to prevent a resource waste.

In a possible design, the sending, by the terminal in the $i^{th}$ slot based on the at least one parameter of the first PUCCHs, information carried on the first PUCCH in the $k^{th}$ slot includes: determining, by the terminal, the $i^{th}$ slot based on the at least one parameter of the first PUCCHs, and sending, in the $i^{th}$ slot, the information carried on the first PUCCH in the $k^{th}$ slot.

In a possible design, a quantity of uplink symbols in the uplink symbols in the $i^{th}$ slot other than $x_4$ uplink symbols is greater than or equal to $m_k$, and $x_4$ is an integer greater than 0. Optionally, the $x_4$ uplink symbols include an uplink symbol that is in the uplink symbols in the $i^{th}$ slot and that is used to transmit an SRS and/or a second format PUCCH.

In a possible design, the at least one parameter further indicates a start symbol number and a quantity L of symbols of a first PUCCH in the first slot in the K slots, a symbol that is in the $i^{th}$ slot and whose number is the same as the start symbol number of the first PUCCH in the first slot is an uplink symbol, L−1 symbols after the symbol that is in the $i^{th}$ slot and whose number is the same as the start symbol number of the first PUCCH in the first slot are uplink symbols, and L is an integer greater than 1.

According to a fourth aspect, an information receiving method is provided, including: sending, by a base station to a terminal, at least one parameter of first PUCCHs, where the at least one parameter indicates a quantity K of slots used to transmit information carried on the first PUCCHs, the at least one parameter further indicates a quantity $m_k$ of symbols occupied by a first PUCCH in the $k^{th}$ slot in the K slots used to transmit the information carried on the first PUCCHs, K is an integer greater than 1, k is an integer greater than 1 and less than or equal to K, and $m_k$ is an integer greater than 0; and receiving, by the base station in the $i^{th}$ slot based on the at least one parameter of the first PUCCHs, information carried on the first PUCCH in the $k^{th}$ slot, where the $k^{th}$ slot is the $k^{th}$ slot in the K slots used to transmit the first PUCCHs, and a quantity of uplink symbols in the $i^{th}$ slot is greater than or equal to $m_k$. According to the method provided in the fourth aspect, the base station may determine the at least one parameter of the first PUCCHs, and receive, in the $i^{th}$ slot based on the at least one parameter, the information carried on the first PUCCH in the $k^{th}$ slot. The $i^{th}$ slot only needs to meet a condition that a quantity of uplink symbols in the $i^{th}$ slot is greater than or equal to $m_k$. Therefore, the terminal can transmit, in any slot that meets a condition that a quantity of uplink symbols in the slot is greater than or equal to $m_k$, the information carried on the first PUCCH, where the slot is used as the $k^{th}$ slot in the K slots, to prevent a resource waste.

In a possible design, the receiving, by the base station in the $i^{th}$ slot based on the at least one parameter of the first PUCCHs, information carried on the first PUCCH in the $k^{th}$ slot includes: determining, by the base station, the $i^{th}$ slot based on the at least one parameter of the first PUCCHs, and receiving, in the $i^{th}$ slot, the information carried on the first PUCCH in the $k^{th}$ slot.

In a possible design, a quantity of uplink symbols in the uplink symbols in the $i^{th}$ slot other than $x_4$ uplink symbols is greater than or equal to $m_k$, and $x_4$ is an integer greater than 0.

In a possible design, the at least one parameter further indicates a start symbol number and a quantity L of symbols of a first PUCCH in the first slot in the K slots, a symbol that is in the $i^{th}$ slot and whose number is the same as the start symbol number of the first PUCCH in the first slot is an uplink symbol, L−1 symbols after the symbol that is in the $i^{th}$ slot and whose number is the same as the start symbol number of the first PUCCH in the first slot are uplink symbols, and L is an integer greater than 1.

According to a fifth aspect, a method for determining, by a terminal, whether a slot can carry a multislot long duration uplink control channel is provided, including: receiving, by the terminal, a slot format; receiving, by the terminal, scheduling signaling sent by a base station, where the scheduling signaling is used to configure a parameter of the multislot long duration uplink control channel; and determining, by the terminal, whether the slot format meets a requirement for carrying the uplink control channel, where if the slot format meets the requirement for carrying the uplink control channel, a resource of the slot is used for the uplink control channel.

In a possible design, the determining, by the terminal, whether the slot format meets a requirement for carrying the uplink control channel further includes: a quantity of uplink symbols in the slot is greater than or equal to a quantity of symbols occupied by the uplink control channel.

In a possible design, the determining, by the terminal, whether the slot format meets a requirement for carrying the uplink control channel further includes: a quantity of consecutive uplink symbols in the slot is greater than or equal to a quantity of symbols occupied by the uplink control channel.

In a possible design, the determining, by the terminal, whether the slot format meets a requirement for carrying the uplink control channel further includes: a value obtained by subtracting X from a quantity of uplink symbols in the slot is greater than or equal to a quantity of symbols occupied by the uplink control channel; and X is an uplink symbol for another use.

In a possible design, that the scheduling signaling is used to configure a parameter of the multislot long duration uplink control channel further includes: the parameter is a symbol range of the long duration uplink control channel in the slot, to be specific, a start symbol number and a quantity of consecutive symbols; and the determining, by the terminal, whether the slot format meets a requirement for carrying the uplink control channel further includes: the slot format is all uplink symbols in the symbol range of the long duration control channel, and the slot can carry the uplink control channel.

According to a sixth aspect, a method for determining, by a terminal, a start symbol of a multislot long uplink control channel in a second slot and a subsequent slot is provided, including: determining, by the terminal, a location of a start symbol in the second slot and the subsequent slot based on a relative location in an uplink symbol range; and transmitting, by the terminal on the start symbol, a signal on the uplink control channel.

In a possible design, the relative location in the uplink symbol range includes: a first symbol in the uplink symbol range in the second slot and the subsequent slot is used as a start symbol resource of the uplink control channel.

In a possible design, the relative location in the uplink symbol range includes: the last symbol in the uplink symbol range in the second slot and the subsequent slot is used as an end symbol resource of the uplink control channel.

In a possible design, the relative location in the uplink symbol range includes: the $x^{th}$ symbol in the uplink symbol range in the second slot and the subsequent slot is used as a start symbol of the uplink control channel, or the $(M-x)^{th}$ symbol is used as an end symbol resource of the uplink control channel; M is a total quantity of uplink symbols or a total quantity of consecutive uplink symbols in a slot, and x is an integer greater than 1.

In a possible design, the relative location in the uplink symbol range includes: the last symbol in the uplink symbol range in the second slot is used as an end symbol of the uplink control channel, the first symbol in an uplink symbol range in the $N^{th}$ slot is used as a start symbol of the uplink control channel, and N is a total quantity of slots occupied by the multislot long duration uplink control channel.

According to a seventh aspect, an information sending apparatus, including: a processing unit, configured to determine $m_i$ uplink symbols in the $i^{th}$ slot; and a communications unit, configured to send, on the $m_i$ uplink symbols, information carried on a first PUCCH in the $k^{th}$ slot, where the $k^{th}$ slot is the $k^{th}$ slot in K slots used to transmit the information carried on the first PUCCHs, that is, the $k^{th}$ slot is the $k^{th}$ slot in the K slots used to transmit the first PUCCHs, a value of $m_i$ is the same as a quantity of symbols occupied by the first PUCCH in the $k^{th}$ slot, K is an integer greater than 1, k is an integer greater than 1 and less than or equal to K, $m_i$ is an integer greater than 0, and i is an integer greater than 0.

In a possible design, i is an integer greater than or equal to k.

In a possible design, the value of $m_i$ is less than 13.

In a possible design, same information is carried on the first PUCCHs in the K slots.

In a possible design, the uplink symbols are $m_i$ consecutive uplink symbols.

In a possible design, the first uplink symbol in the $m_i$ uplink symbols is the $x_1^{th}$ uplink symbol in uplink symbols in the $i^{th}$ slot; or the last uplink symbol in the $m_i$ uplink symbols is the last-but-$(y_1-1)$ uplink symbol in uplink symbols in the $i^{th}$ slot, and both $x_1$ and $y_1$ are integers greater than 0. Optionally, when both $x_1$ and $y_1$ are greater than 1, the first $x_1-1$ symbols in the uplink symbols in the $i^{th}$ slot include a symbol used to send an SRS and/or a second PUCCH, and the last $y_1-1$ symbols in the uplink symbols in the $i^{th}$ slot include a symbol used to send the SRS and/or the second PUCCH.

In a possible design, k is equal to K, and the first uplink symbol in the $m_i$ uplink symbols is the first uplink symbol in uplink symbols in the $i^{th}$ slot.

In a possible design, k>2. If the last uplink symbol in $m_{(i-r)}$ uplink symbols in the $(i-r)^{th}$ slot is the last uplink symbol in uplink symbols in the $(i-r)^{th}$ slot, the first uplink symbol in the $m_i$ uplink symbols is the first uplink symbol in uplink symbols in the $i^{th}$ slot; or if the first uplink symbol in $m_{(i-r)}$ uplink symbols in the $(i-r)^{th}$ slot is the first uplink symbol in uplink symbols in the $(i-r)^{th}$ slot, the last uplink symbol in the $m_i$ uplink symbols is the last uplink symbol in uplink symbols in the $i^{th}$ slot; the $m_{(i-r)}$ uplink symbols are used to transmit information carried on a first PUCCH in the $(k-1)^{th}$ slot; the $(k-1)^{th}$ slot is the $(k-1)^{th}$ slot in the K slots used to transmit the information carried on the first PUCCHs; $m_{(i-r)}$ is an integer greater than 0; r is an integer greater than 0; and i–r is an integer greater than 0.

In a possible design, the first PUCCH in the $k^{th}$ slot includes a first part and a second part, $m_{i1}$ uplink symbols in the $m_i$ uplink symbols are used to transmit the first part, $m_{i2}$ uplink symbols in the $m_i$ uplink symbols are used to transmit the second part, and both $m_{i1}$ and $m_{i2}$ are integers greater than 0 and less than $m_i$; and the first uplink symbol in the $m_{i1}$ uplink symbols is the first uplink symbol in uplink symbols in the $i^{th}$ slot, and the last uplink symbol in the $m_{i2}$ uplink symbols is the last uplink symbol in the uplink symbols in the $i^{th}$ slot; or the first uplink symbol in the $m_{i1}$ uplink symbols is the first uplink symbol in uplink symbols in the $i^{th}$ slot, the last uplink symbol in the $m_{i2}$ uplink symbols is the last-but-$(y_2-1)$ uplink symbol in the uplink symbols in the $i^{th}$ slot, $y_2$ is an integer greater than 1, and optionally, the last $y_2-1$ uplink symbols in the uplink symbols in the $i^{th}$ slot include an uplink symbol used to transmit an SRS and/or a second format PUCCH; or the first uplink symbol in the $m_{i1}$ uplink symbols is the $x_2^{th}$ uplink symbol in uplink symbols in the $i^{th}$ slot, the last uplink symbol in the $m_{i2}$ uplink symbols is the last uplink symbol in the uplink symbols in the $i^{th}$ slot, $x_2$ is an integer greater than 1, and optionally, the first $x_2-1$ uplink symbols in the uplink symbols in the $i^{th}$ slot include an uplink symbol used to transmit an SRS and/or a second format PUCCH; or the first uplink symbol in the $m_{i1}$ uplink symbols is the $x_3^{th}$ uplink symbol in uplink symbols in the $i^{th}$slot, the last uplink symbol in the $m_{i2}$ uplink symbols is the last-but-$(y_3-1)$ uplink symbol in the uplink symbols in the $i^{th}$ slot, both $x_3$ and $y_3$ are integers greater than 1, and optionally, the first $x_3-1$ uplink symbols in the uplink symbols in the $i^{th}$ slot and the last $y_3-1$ uplink symbols in the uplink symbols in the $i^{th}$ slot include an uplink symbol used to transmit an SRS and/or a second format PUCCH.

According to an eighth aspect, an information receiving apparatus, including: a processing unit, configured to determine $m_i$ uplink symbols in the $i^{th}$ slot; and a communications unit, configured to send, on the $m_i$ uplink symbols, information carried on a first PUCCH in the $k^{th}$ slot, where the $k^{th}$ slot is the $k^{th}$ slot in K slots used to transmit information carried on first PUCCHs, that is, the $i^{th}$ slot is the $k^{th}$ slot in the K slots used to transmit the first PUCCHs, a value of $m_i$ is the same as a quantity of symbols occupied by the first PUCCH in the $k^{th}$ slot, K is an integer greater than 1, k is an integer greater than 1 and less than or equal to K, $m_i$ is an integer greater than 0, and i is an integer greater than 0.

In a possible design, i is an integer greater than or equal to k.

In a possible design, the value of $m_i$ is less than 13.

In a possible design, same information is carried on the first PUCCHs in the K slots.

In a possible design, the $m_i$ uplink symbols are $m_i$ consecutive uplink symbols.

In a possible design, the first uplink symbol in the $m_i$ uplink symbols is the $x_1^{th}$ uplink symbol in uplink symbols in the $i^{th}$ slot; or the last uplink symbol in the $m_i$ uplink symbols is the last-but-$(y_1-1)$ uplink symbol in uplink symbols in the $i^{th}$ slot, and both $x_1$ and $y_1$ are integers greater than 0. Optionally, when both $x_1$ and $y_1$ are greater than 1, the first $x_1-1$ symbols in the uplink symbols in the $i^{th}$ slot include a symbol used to send an SRS and/or a second PUCCH, and the last $y_1-1$ symbols in the uplink symbols in the $i^{th}$ slot include a symbol used to send the SRS and/or the second PUCCH.

In a possible design, k is equal to K, and the first uplink symbol in the $m_i$ uplink symbols is the first uplink symbol in uplink symbols in the $i^{th}$ slot.

In a possible design, k>2. If the last uplink symbol in $m_{(i-r)}$ uplink symbols in the $(i-r)^{th}$ slot is the last uplink symbol in uplink symbols in the $(i-r)^{th}$ slot, the first uplink symbol in the $m_i$ uplink symbols is the first uplink symbol in uplink symbols in the $i^{th}$ slot; or if the first uplink symbol in $m_{(i-r)}$ uplink symbols in the $(i-r)^{th}$ slot is the first uplink symbol in uplink symbols in the $(i-r)^{th}$ slot, the last uplink symbol in the $m_i$ uplink symbols is the last uplink symbol in uplink symbols in the $i^{th}$ slot; the $m_{(i-r)}$ uplink symbols are used to transmit information carried on a first PUCCH in the $(k-1)^{th}$ slot; the $(k-1)^{th}$ slot is the $(k-1)^{th}$ slot in the K slots used to transmit the information carried on the first PUCCHs; $m_{(i-r)}$ is an integer greater than 0; r is an integer greater than 0; and i−r is an integer greater than 0.

In a possible design, the first PUCCH in the $k^{th}$ slot includes a first part and a second part, $m_{i1}$ uplink symbols in the $m_i$ uplink symbols are used to transmit the first part, $m_{i2}$ uplink symbols in the $m_i$ uplink symbols are used to transmit the second part, and both $m_{i1}$ and $m_{i2}$ are integers greater than 0 and less than $m_i$; and the first uplink symbol in the $m_{i1}$ uplink symbols is the first uplink symbol in uplink symbols in the $i^{th}$ slot, and the last uplink symbol in the $m_{i2}$ uplink symbols is the last uplink symbol in the uplink symbols in the $i^{th}$ slot; or the first uplink symbol in the $m_{i1}$ uplink symbols is the first uplink symbol in uplink symbols in the $i^{th}$ slot, the last uplink symbol in the $m_{i2}$ uplink symbols is the last-but-$(y_2-1)$ uplink symbol in the uplink symbols in the $i^{th}$ slot, $y_2$ is an integer greater than 1, and optionally, the last $y_2-1$ uplink symbols in the uplink symbols in the $i^{th}$ slot include an uplink symbol used to transmit an SRS and/or a second format PUCCH; or the first uplink symbol in the $m_{i1}$ uplink symbols is the $x_2^{th}$ uplink symbol in uplink symbols in the $i^{th}$ slot, the last uplink symbol in the $m_{i2}$ uplink symbols is the last uplink symbol in the uplink symbols in the $i^{th}$ slot, $x_2$ is an integer greater than 1, and optionally, the first $x_2-1$ uplink symbols in the uplink symbols in the $i^{th}$ slot include an uplink symbol used to transmit an SRS and/or a second format PUCCH, or the first uplink symbol in the $m_{i1}$ uplink symbols is the $x_3^{th}$ uplink symbol in uplink symbols in the $i^{th}$ slot, the last uplink symbol in the $m_{i2}$ uplink symbols is the last-but-$(y_3-1)$ uplink symbol in the uplink symbols in the $i^{th}$ slot, both $x_3$ and $y_3$ are integers greater than 1, and optionally, the first $x_3-1$ uplink symbols in the uplink symbols in the $i^{th}$slot and the last $y_3-1$ uplink symbols in the uplink symbols in the $i^{th}$ slot include an uplink symbol used to transmit an SRS and/or a second format PUCCH.

According to a ninth aspect, an information sending apparatus is provided, including a processing unit and a communications unit. The processing unit is configured to receive at least one parameter of first PUCCHs from a base station by using the communications unit, where the at least one parameter indicates a quantity K of slots used to transmit information carried on the first PUCCHs, the at least one parameter further indicates a quantity $m_k$ of symbols occupied by a first PUCCH in the $k^{th}$ slot in the K slots used to transmit the information carried on the first PUCCHs, K is an integer greater than 1, k is an integer greater than 1 and less than or equal to K, and $m_k$ is an integer greater than 0. The processing unit is further configured to send, in the $i^{th}$ slot based on the at least one parameter of the first PUCCHs by using the communications unit, information carried on the first PUCCH in the $k^{th}$ slot, where the $k^{th}$ slot is the $k^{th}$ slot in the K slots used to transmit the first PUCCHs, and a quantity of uplink symbols in the $i^{th}$ slot is greater than or equal to $m_k$.

In a possible design, the processing unit is specifically configured to: determine the $i^{th}$ slot based on the at least one parameter of the first PUCCHs, and send, in the $i^{th}$ slot, the information carried on the first PUCCH in the $k^{th}$ slot.

In a possible design, a quantity of uplink symbols in the uplink symbols in the $i^{th}$ slot other than $x_4$ uplink symbols is greater than or equal to $m_k$, and $x_4$ is an integer greater than 0.

In a possible design, the at least one parameter further indicates a start symbol number and a quantity L of symbols of a first PUCCH in the first slot in the K slots, a symbol that is in the $i^{th}$ slot and whose number is the same as the start symbol number of the first PUCCH in the first slot is an uplink symbol, L−1 symbols after the symbol that is in the $i^{th}$ slot and whose number is the same as the start symbol number of the first PUCCH in the first slot are uplink symbols, and L is an integer greater than 1.

According to a tenth aspect, an information receiving apparatus is provided, including a processing unit and a communications unit. The processing unit is configured to send at least one parameter of first PUCCHs to a terminal by using the communications unit, where the at least one parameter indicates a quantity K of slots used to transmit information carried on the first PUCCHs, the at least one parameter further indicates a quantity $m_k$ of symbols occupied by a first PUCCH in the $k^{th}$ slot in the K slots used to transmit the information carried on the first PUCCHs, K is an integer greater than 1, k is an integer greater than 1 and less than or equal to K, and $m_k$ is an integer greater than 0. The processing unit is further configured to receive, in the $i^{th}$ slot based on the at least one parameter of the first PUCCHs, information carried on the first PUCCH in the $k^{th}$ slot, where the $k^{th}$ slot is the $k^{th}$ slot in the K slots used to transmit the first PUCCHs, and a quantity of uplink symbols in the $i^{th}$ slot is greater than or equal to $m_k$.

In a possible design, the processing unit is specifically configured to: determine the $i^{th}$ slot based on the at least one parameter of the first PUCCHs, and receive, in the $i^{th}$ slot, the information carried on the first PUCCH in the $k^{th}$ slot.

In a possible design, a quantity of uplink symbols in the uplink symbols in the $i^{th}$ slot other than $x_4$ uplink symbols is greater than or equal to $m_k$, and $x_4$ is an integer greater than 0.

In a possible design, the at least one parameter further indicates a start symbol number and a quantity L of symbols of a first PUCCH in the first slot in the K slots, a symbol that is in the $i^{th}$ slot and whose number is the same as the start symbol number of the first PUCCH in the first slot is an uplink symbol, L−1 symbols after the symbol that is in the $i^{th}$ slot and whose number is the same as the start symbol number of the first PUCCH in the first slot are uplink symbols, and L is an integer greater than 1.

According to an eleventh aspect, an information sending apparatus is provided, including a memory and a processor. The memory is configured to store a computer executable instruction, and the processor executes the computer executable instruction stored in the memory, so that the apparatus implements any method according to the first aspect, the third aspect, the fifth aspect, or the sixth aspect. The apparatus may exist in a product form of a chip.

According to a twelfth aspect, an information receiving apparatus is provided, including a memory and a processor. The memory is configured to store a computer executable instruction, and the processor executes the computer executable instruction stored in the memory, so that the apparatus implements any method according to the second aspect or the fourth aspect. The apparatus may exist in a product form of a chip.

According to a thirteenth aspect, a computer readable storage medium is provided, including an instruction. When the instruction is run on a computer, the computer is enabled to perform any method according to the first aspect, the third aspect, the fifth aspect, or the sixth aspect.

According to a fourteenth aspect, a computer readable storage medium is provided, including an instruction. When the instruction is run on a computer, the computer is enabled to perform any method according to the second aspect or the fourth aspect.

According to a fifteenth aspect, a computer program product including an instruction is provided. When the computer program product is run on a computer, the computer is enabled to perform any method according to the first aspect, the third aspect, the fifth aspect, or the sixth aspect.

According to a sixteenth aspect, a computer program product including an instruction is provided. When the instruction is run on a computer, the computer is enabled to perform any method according to the second aspect or the fourth aspect.

For technical effects brought by any design in the seventh aspect to the sixteenth aspect, refer to technical effects brought by different design manners in the first aspect to the sixth aspect. Details are not described herein again.

DESCRIPTION OF EMBODIMENTS

The following describes technical solutions in embodiments of this application with reference to the accompanying drawings in the embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more.

Figure 1:
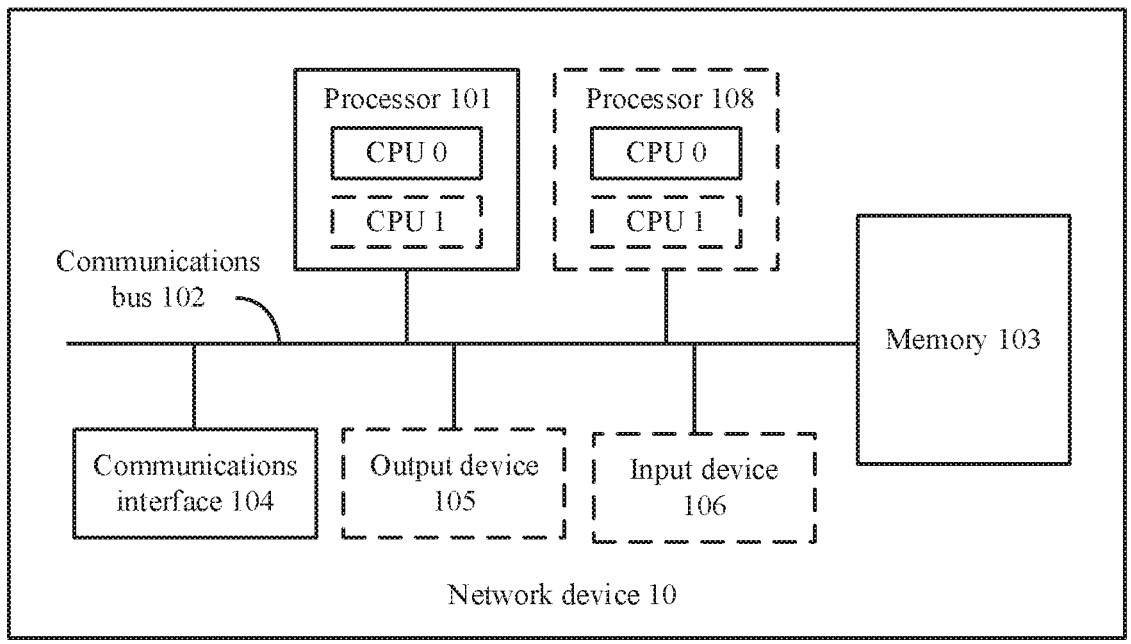
FIG. 1 is a schematic structural diagram of hardware of a network device according to an embodiment of this application.

FIG. 1 is a schematic structural diagram of hardware of a network device 10 according to an embodiment of this application. The network device 10 may be a terminal or a base station. The network device 10 includes at least one processor 101, a communications bus 102, a memory 103, and at least one communications interface 104.

The processor 101 may be a general-purpose central processing unit (central processing unit, CPU for short), a microprocessor, an application-specific integrated circuit (application-specific integrated circuit, ASIC for short), or one or more integrated circuits configured to control program execution of the solutions in this application.

The communications bus 102 may include a path used to transmit information between the foregoing components.

The communications interface 104 may be configured to be used by any apparatus such as a transceiver to communicate with another device or communications network such as the Ethernet, a radio access network (radio access network, RAN for short), or a wireless local area network (radio local area networks, WLAN for short).

The memory 103 may be a read-only memory (read-only memory, ROM for short) or another type of static storage device that can store static information and instructions, a random access memory (random access memory, RAM for short) or another type of dynamic storage device that can store information and instructions, or may be an electrically erasable programmable read-only memory (electrically erasable programmable read-only memory, EEPROM for short), a compact disc read-only memory (compact disc read-only memory, CD-ROM for short) or other compact disc storage, optical disc storage (including a compressed optical disc, a laser disc, an optical disc, a digital versatile disc, a blue-ray optical disc, and the like), a magnetic disk storage medium or another magnetic storage device, or any other medium that can carry or store expected program code in a form of an instruction or a data structure and that can be accessed by a computer, but is not limited thereto. The memory may exist independently, and is connected to the processor by using the bus. The memory may be integrated with the processor.

The memory 103 is configured to store application program code for performing the solutions of this application, and the processor 101 controls the execution. The processor 101 is configured to execute the application program code stored in the memory 103, to implement the methods provided in the following embodiments of this application.

In specific implementation, in an embodiment, the processor 101 may include one or more CPUs, for example, a CPU 0 and a CPU 1 in FIG. 1.

In specific implementation, in an embodiment, the network device 10 may include a plurality of processors, for example, the processor 101 and a processor 108 in FIG. 1. Each of the processors may be a single-core (single-CPU) processor or a multi-core (multi-CPU) processor. The processor herein may be one or more devices, circuits, and/or processing cores for processing data (for example, a computer program instruction).

In specific implementation, in an embodiment, the network device 10 may further include an output device 105 and an input device 106.

Figure 2:
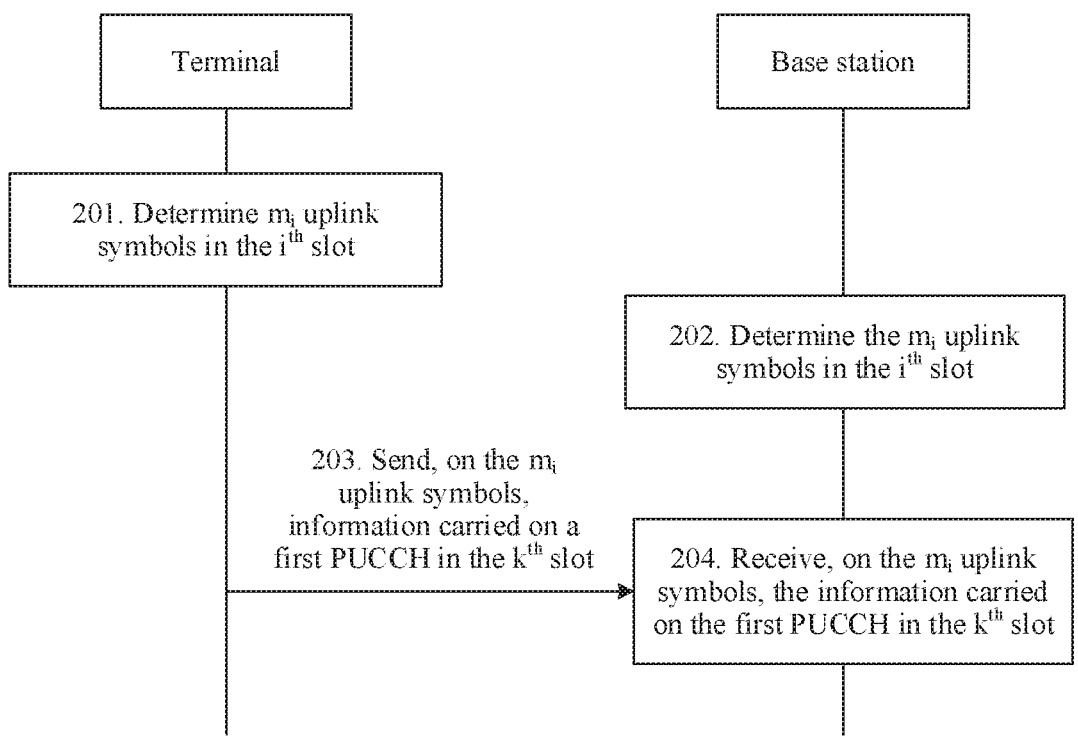
FIG. 2 is a flowchart of an information sending and receiving method according to an embodiment of this application.

An embodiment of this application provides an information sending and receiving method. As shown in FIG. 2, the method includes the following steps.

201. A terminal determines $m_i$ uplink symbols in the $i^{th}$ slot.

202. A base station determines the $m_i$ uplink symbols in the $i^{th}$ slot.

Step 201 and step 202 are not performed in sequence. In other words, step 202 may be performed after step 201, or may be performed before step 201.

Optionally, the $m_i$ uplink symbols are $m_i$ consecutive uplink symbols. Certainly, the $m_i$ uplink symbols may alternatively be inconsecutive uplink symbols. This is not specifically limited in this embodiment of this application. It should be noted that when values of i are different, values of $m_i$ may be the same or may be different.

203. The terminal sends, on the $m_i$ uplink symbols, information carried on a first PUCCH in the $k^{th}$ slot.

204. The base station receives, on the $m_i$ uplink symbols, the information carried on the first PUCCH in the $k^{th}$ slot.

The $k^{th}$ slot is the $k^{th}$ slot in K slots used to transmit information carried on first PUCCHs. In other words, the $k^{th}$ slot is the $k^{th}$ slot in the K slots used to transmit the first PUCCHs. A value of $m_i$ is the same as a quantity of symbols occupied by the first PUCCH in the $k^{th}$ slot, K is an integer greater than 1, k is an integer greater than 1 and less than or equal to K, is an integer greater than 0, and i is an integer greater than 0.

The $i^{th}$ slot is one of slots covered by the first PUCCH. Herein, $m_i$ may be a quantity of symbols carrying the first PUCCH. Optionally, $m_i$ may be an integer greater than 3. In other words, the first PUCCH may be a long (long) duration PUCCH. The long duration PUCCH may also be referred to as a first duration PUCCH, and a quantity of symbols occupied by the first duration PUCCH is greater than 3. Optionally, the value of $m_i$ may be less than 13.

As a 5G wireless communications technology enters a discussion phase, currently, there are two research directions in a 3rd generation partnership project (3rd generation partnership project, 3GPP for short) organization: a research direction in which backward compatibility is considered and a research direction in which backward compatibility is not considered. The research direction in which backward compatibility is not considered is referred to as 5G new radio (new radio, NR for short).

In 5G NR, a PUCCH may carry uplink control information such as an acknowledgment (acknowledgment, ACK for short)/negative acknowledgment (negative acknowledgment, NACK for short), and a channel quality indicator (channel quality indicator, CQI for short). The PUCCH used to carry the uplink control information may include a short (short) duration PUCCH and a long duration PUCCH. The short duration PUCCH may occupy one or two orthogonal frequency division multiplexing (orthogonal frequency division multiplexing, OFDM for short) symbols in time domain. The short duration PUCCH may also be referred to as a second duration PUCCH, and the second duration PUCCH occupies one or two symbols. The long duration PUCCH may occupy four to 14 OFDM symbols in one slot.

The long duration PUCCH is transmitted in a plurality of slots, so that a coverage area of the long duration PUCCH can be improved. Specifically, transmission duration of the long duration PUCCH in each slot may be the same or may be different.

Optionally, same information may be carried on the first PUCCHs in the K slots.

Optionally, i may be an integer greater than or equal to k. Specifically, the $i^{th}$ slot may be a slot determined by the terminal and the base station from a plurality of slots. For example, when the base station instructs the terminal to send, in a plurality of slots, the information carried on the first PUCCHs, the terminal may sequentially determine, by using a slot in which the information is received as a start slot, the K slots used to transmit the information carried on the first PUCCHs. The slot that is determined by the terminal and that is used to transmit the information carried on the first PUCCH in the $k^{th}$ slot in the K slots is the $i^{th}$ slot.

According to the method provided in this embodiment of this application, the terminal and the base station may determine, based on a preset rule, an uplink symbol used to transmit the information carried on the first PUCCH, and does not transmit, on a fixed uplink symbol, the information carried on the first PUCCH. Therefore, flexibility of transmitting the information carried on the first PUCCH can be improved. In an implementation, the base station indicates, to the terminal, a start symbol in uplink symbols used to transmit the information carried on the first PUCCH in each slot. However, in comparison with the method provided in this embodiment of this application, this implementation increases a large quantity of signaling overheads.

Specifically, in this embodiment of this application, the terminal or the base station may determine the $m_i$ uplink symbols in any one of the following manners.

Manner 1: Determine the $m_i$ uplink symbols by using a slot format of the $i^{th}$ slot.

In 5G NR, a slot is used as a basic scheduling unit, and one slot may include 14 symbols. Specifically, the symbols may be an uplink symbol, a downlink symbol, an idle symbol, a symbol with an unknown use, or a reserved symbol. The idle symbol is a symbol whose use is not indicated. The symbol with an unknown use is a symbol that is created as a redundant design to support a plurality of service types. The reserved symbol is designed to support switching between service types or between a plurality of types of transmission.

One slot includes symbols with various uses. For example, a use of symbols in one slot may be that the first three symbols are downlink symbols, and the last 10 symbols are uplink symbols. A slot format is used to describe a quantity of symbols in a slot and a use of each symbol. In FIG. 3 to FIG. 13, "U" represents an uplink symbol, "D" represents a downlink symbol, and an unmarked symbol may be a symbol of another type.

Manner (1): The first uplink symbol in the $m_i$ uplink symbols is the $x_1^{th}$ uplink symbol in uplink symbols in the $i^{th}$ slot, and $x_1$ is an integer greater than 0.

Figure 3:
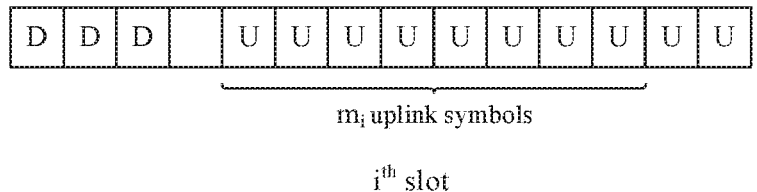
FIG. 3 to FIG. 13 are respectively schematic diagrams of $m_i$ uplink symbols according to an embodiment of this application.

When $x_1$ is equal to 1, referring to FIG. 3, the first uplink symbol in the $m_i$ uplink symbols is the first uplink symbol in the uplink symbols in the $i^{th}$ slot. In FIG. 3, that the value of $m_i$ is 8 is used as an example for description.

Figure 4:
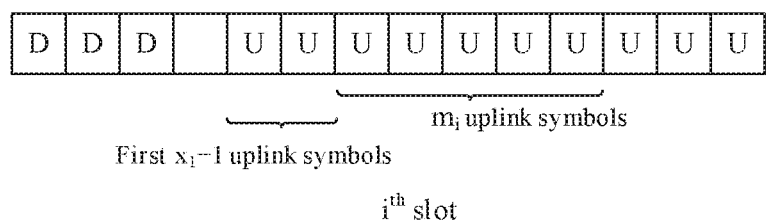

When $x_1$ is greater than 1, referring to FIG. 4, the first uplink symbol in the $m_i$ uplink symbols is the $x_1^{th}$ uplink symbol in the uplink symbols in the $i^{th}$ slot. Optionally, the first $x_1-1$ symbols in the uplink symbols in the $i^{th}$ slot include but are not limited to a symbol used to send a sounding reference signal (sounding reference signal, SRS for short) and/or a second PUCCH, and the first PUCCH and the second PUCCH are different PUCCHs. In FIG. 4, that the value of $m_i$ is 5 and a value of $x_1$ is 3 is used as an example for description.

The second PUCCH may be a short duration PUCCH or a PUCCH in a format different from that of the first PUCCH.

Manner (2): The last uplink symbol in the $m_i$ uplink symbols is the last-but-($y_1-1$) uplink symbol in uplink symbols in the $i^{th}$ slot, and $y_1$ is an integer greater than 0.

Figure 5:
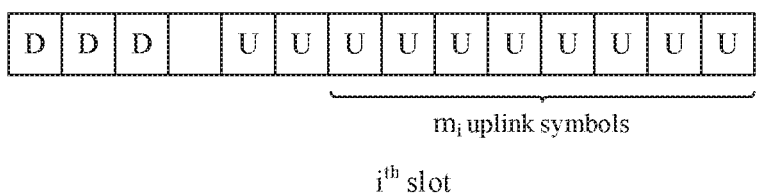

When $y_1$ is equal to 1, referring to FIG. 5, the last uplink symbol in the $m_i$ uplink symbols is the last uplink symbol in the uplink symbols in the $i^{th}$ slot. In FIG. 5, that the value of $m_i$ is 8 is used as an example for description.

Figure 6:
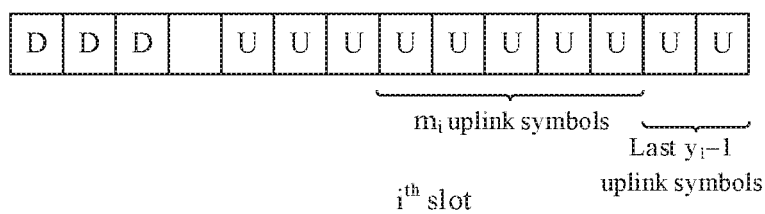

When $y_1$ is greater than 1, referring to FIG. 6, the last uplink symbol in the $m_i$ uplink symbols is the last-but-($y_1-1$) uplink symbol in the uplink symbols in the $i^{th}$ slot. Optionally, the last $y_1-1$ symbols in the uplink symbols in the $i^{th}$ slot include but are not limited to a symbol used to send an SRS and/or a second PUCCH. In FIG. 6, that the value of $m_i$ is 5 and a value of $y_1$ is 3 is used as an example for description.

Manner 2: Determine the $m_i$ uplink symbols by using the $(i-r)^{th}$ slot. In this case, k>2, $m_{(i-r)}$ uplink symbols are uplink symbols in the $(i-r)^{th}$ slot, the $m_{(i-r)}$ uplink symbols are used to transmit information carried on a first PUCCH in the $(k-1)^{th}$ slot, the $(k-1)^{th}$ slot is the $(k-1)^{th}$ slot in the K slots used to transmit the information carried on the first PUCCHs, $m_{(i-r)}$ is an integer greater than 0, r is an integer greater than 0, and i-r is an integer greater than 0.

Figure 7:
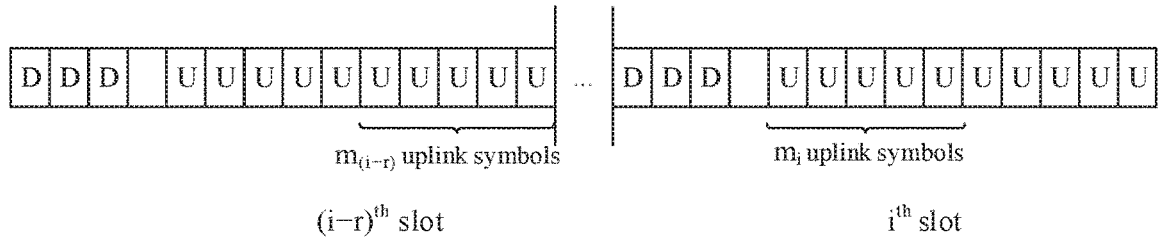

Manner (3): Referring to FIG. 7, if the last uplink symbol in the $m_{(i-r)}$ uplink symbols in the $(i-r)^{th}$ slot is the last uplink symbol in uplink symbols in the $(i-r)^{th}$ slot, the first uplink symbol in the $m_i$ uplink symbols is the first uplink symbol in uplink symbols in the $i^{th}$ slot. In FIG. 7, that both the value of $m_i$ and a value of $m_{(i-r)}$ are 5 is used as an example for description.

Optionally, $m_{(i-r)}$ may be an integer greater than 3.

In Manner (3), the $m_{(i-r)}$ uplink symbols are relatively close to the $m_i$ uplink symbols. Therefore, a channel measurement result on the $m_{(i-r)}$ uplink symbols and a channel measurement result on the $m_i$ uplink symbols may be jointly used. Therefore, channel detection performance is improved.

Figure 8:
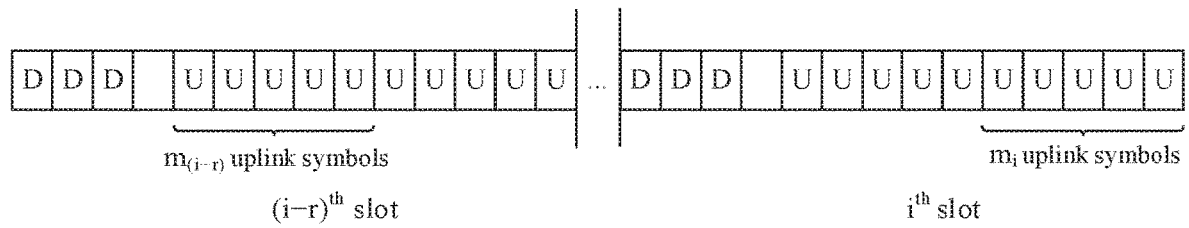

Manner (4): Referring to FIG. 8, if the first uplink symbol in the $m_{(i-r)}$ uplink symbols in the $(i-r)^{th}$ slot is the first uplink symbol in uplink symbols in the $(i-r)^{th}$ slot, the last uplink symbol in the $m_i$ uplink symbols is the last uplink symbol in uplink symbols in the $i^{th}$ slot. In FIG. 8, that both the value of $m_i$ and a value of $m_{(i-r)}$ are 5 is used as an example for description.

Specifically, the terminal or the base station may determine, in each of the K slots except the first slot in a manner described in Manner 1 or Manner 2, uplink symbols (namely, $m_i$ uplink symbols) used to transmit the information carded on the first PUCCH.

Figure 9:
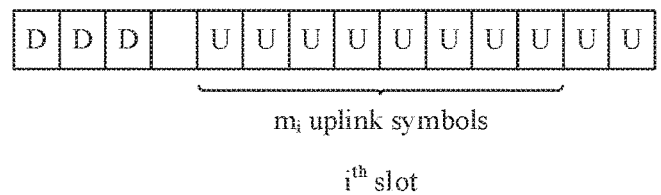

Optionally, referring to FIG. 9, if k is equal to K, and the first uplink symbol in the $m_i$ uplink symbols is the first uplink symbol in the uplink symbols in the $i^{th}$ slot. In FIG. 9, that the value of $m_i$ is 8 is used as an example for description. In this case, it helps the base station to earlier complete receiving of the information carried on the first PUCCH. Therefore, a delay can be reduced.

In this case, the terminal or the base station may determine, in each of the K slots except the first slot and the last slot in a manner described in Manner 1 or Manner 2, an uplink symbol used to transmit the information carried on the first PUCCH. Certainly, determining may be alternatively performed in another manner. This is not specifically limited in this embodiment of this application.

In the foregoing embodiment, frequency hopping may or may not be performed on the first PUCCH in the $k^{th}$ slot. When frequency hopping is performed on the first PUCCH in the $k^{th}$ slot, the first PUCCH in the $k^{th}$ slot includes a first part and a second part, $m_{i1}$ uplink symbols in the $m_i$ uplink symbols are used to transmit the first part, $m_{i2}$ uplink symbols in the $m_i$ uplink symbols are used to transmit the second part, both $m_{i1}$ and $m_{i2}$ are integers greater than 0 and less than $m_i$, and a sum of $m_{i1}$ and $m_{i2}$ may be $m_i$. In this case, the $m_{i1}$ uplink symbols and the $m_{i2}$ uplink symbols may be determined in any one of the following manners.

Figure 10:
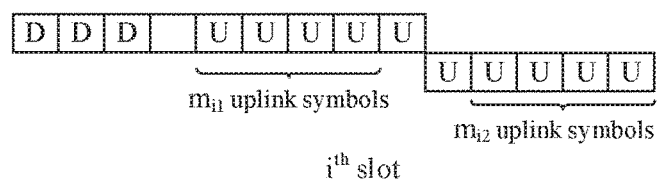

Manner (5): Referring to FIG. 10, the first uplink symbol in $m_{i1}$ uplink symbols is the first uplink symbol in uplink symbols in the $i^{th}$ slot, and the last uplink symbol in $m_{i2}$ uplink symbols is the last uplink symbol in the uplink symbols in the $i^{th}$ slot. In FIG. 10, that both a value of $m_{i1}$ and a value of $m_{i2}$ are 4 is used as an example for description.

Figure 11:
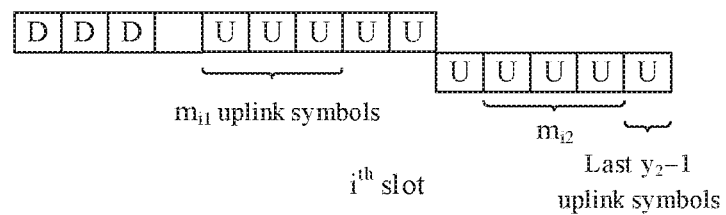

Manner (6): Referring to FIG. 11, the first uplink symbol in $m_{i1}$ uplink symbols is the first uplink symbol in uplink symbols in the $i^{th}$ slot, the last uplink symbol in $m_{i2}$ uplink symbols is the last-but-$(y_2-1)$ uplink symbol in the uplink symbols in the $i^{th}$ slot, and $y_2$ is an integer greater than 1. In FIG. 11, that both a value of $m_{i1}$ and a value of $m_{i2}$ are 3 and a value of $y_2$ is 2 is used as an example for description.

Optionally, the last $y_2-1$ symbols in the uplink symbols in the $i^{th}$ slot include but are not limited to an uplink symbol used to transmit an SRS and/or a second PUCCH.

Figure 12:
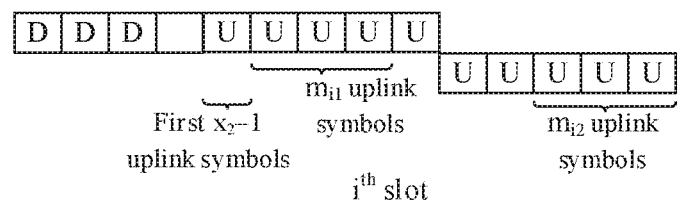

Manner (7): Referring to FIG. 12, the first uplink symbol in $m_{i1}$ uplink symbols is the $x_2^{th}$ uplink symbol in uplink symbols in the $i^{th}$ slot, the last uplink symbol in $m_{i2}$ uplink symbols is the last uplink symbol in the uplink symbols in the $i^{th}$ slot, and $x_2$ is an integer greater than 1. In FIG. 12, that both a value of $m_{i1}$ and a value of $m_{i2}$ are 3 and a value of $x_2$ is 2 is used as an example for description.

Optionally, the first $x_2-1$ symbols in the uplink symbols in the $i^{th}$ slot include but are not limited to an uplink symbol used to transmit an SRS and/or a second PUCCH.

Figure 13:
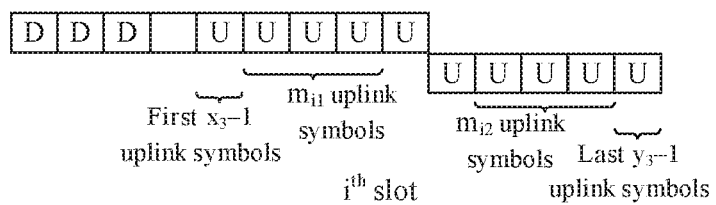

Manner (8): Referring to FIG. 13, the first uplink symbol in $m_{i1}$ uplink symbols is the $x_3^{th}$ uplink symbol in uplink symbols in the $i^{th}$ slot, the last uplink symbol in $m_{i2}$ uplink symbols is the last-but-$(y_3-1)$ uplink symbol in the uplink symbols in the $i^{th}$ slot, and both $x_3$ and $y_3$ are integers greater than 1. In FIG. 13, that both a value of $m_{i1}$ and a value of $m_{i2}$ are 3 and both a value of $x_3$ and a value of $y_3$ are 2 is used as an example for description.

Optionally, the first $x_3-1$ symbols in the uplink symbols in the $i^{th}$ slot and the last $y_3-1$ uplink symbols in the uplink symbols in the $i^{th}$ slot include but are not limited to an uplink symbol used to transmit an SRS and/or a second PUCCH.

In this case, the first part may be a first frequency hopping part of the first PUCCH in the $k^{th}$ slot, and the second part may be a second frequency hopping part of the first PUCCH in the $k^{th}$ slot. FIG. 10 to FIG. 13 are also drawn by using this as an example. Certainly, the first part and the second part may be just two parts of the first PUCCH in the $k^{th}$ slot, and not two frequency hopping parts of the first PUCCH in the $k^{th}$ slot. This is not specifically limited in this embodiment of this application.

The foregoing embodiment is a method for determining, when it is learned that the information carried on the first PUCCH can be transmitted in the $i^{th}$ slot, an uplink symbol that is in the $i^{th}$ slot and that is used to transmit the information carried on the first PUCCH. In 5G NR, when the information carried on the first PUCCH is transmitted on a plurality of fixed symbols in each slot, because a slot format changes frequently, it is relatively difficult to transmit, on the plurality of fixed symbols in the slot, the information carried on the first PUCCH. For example, if the information carried on the first PUCCH is transmitted on the fixed fifth to twelfth symbols in the K slots, all the fifth to twelfth symbols in each of the K slots need to be uplink symbols. However, actually, the information carried on the first PUCCH can be transmitted in one slot provided that the slot includes eight uplink symbols. It can be learned from the foregoing analysis that the slot format is clearly required for transmitting, on the plurality of fixed symbols in each slot, the information carried on the first PUCCH, thereby wasting a large quantity of slots in which there are enough uplink symbols but the uplink symbols are not located at a fixed location. Consequently, resources are not fully used.

Figure 14:
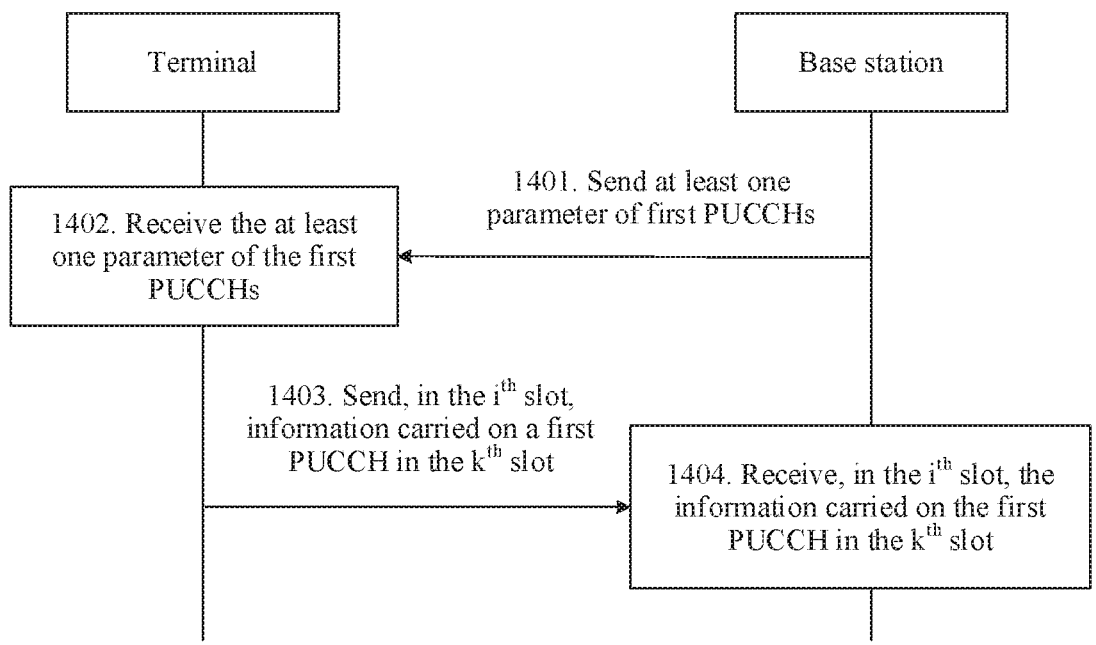
FIG. 14 is another flowchart of an information sending and receiving method according to an embodiment of this application.

Therefore, an embodiment of this application further provides an information sending and receiving method, including a method for determining an $i^{th}$ slot. Referring to FIG. 14, the method includes the following steps.

1401. A base station sends at least one parameter of first PUCCHs to a terminal.

1402. The terminal receives the at least one parameter of the first PUCCHs from the base station.

The at least one parameter indicates a quantity K of slots used to transmit information carried on the first PUCCHs, the at least one parameter further indicates a quantity $m_k$ of symbols occupied by a first PUCCH in the $k^{th}$ slot in the K slots used to transmit the information carried on the first PUCCHs, K is an integer greater than 1, k is an integer greater than 1 and less than or equal to K, and $m_k$ is an integer greater than 0.

A quantity of symbols occupied by a first PUCCH in each of the K slots may be the same or may be different.

For example, if K=3, for the at least one parameter of the first PUCCHs that is sent by the base station to the terminal, refer to Table 1.

TABLE 1

| Quantity of slots | Quantity of symbols in the first slot | Quantity of symbols in the second slot | Quantity of symbols in the third slot |
| --- | --- | --- | --- |
| 3 | $m_1$ | $m_2$ | $m_3$ |

Specifically, if a same quantity of symbols are occupied by the first PUCCH in each of the K slots, the base station may alternatively send, to the terminal, the quantity K of slots and the quantity of symbols occupied by the first PUCCH in each slot or a quantity of symbols occupied by the first PUCCH in the first slot in the K slots.

1403. The terminal sends, in the $i^{th}$ slot based on the at least one parameter of the first PUCCHs, information carried on the first PUCCH in the $k^{th}$ slot.

The $k^{th}$ slot is the $k^{th}$ slot in the K slots used to transmit the first PUCCHs.

1404. The base station receives, in the $i^{th}$ slot based on the at least one parameter of the first PUCCHs, the information carried on the first PUCCH in the $k^{th}$ slot.

A quantity of uplink symbols in the $i^{th}$ slot is greater or equal to $m_k$. Further, a quantity of consecutive uplink symbols in the $i^{th}$ slot is greater than or equal to $m_k$.

According to the method provided in this embodiment of this application, the base station and the terminal may determine the at least one parameter of the first PUCCHs, and transmit, in the $i^{th}$ slot based on the at least one parameter, the information carried on the first PUCCH in the $k^{th}$ slot. The $i^{th}$ slot only needs to meet a condition that a quantity of uplink symbols in the $i^{th}$ slot is greater than or equal to $m_k$. Therefore, the terminal can transmit, in any slot that meets a condition that a quantity of uplink symbols in the slot is greater than or equal to $m_k$, the information carried on the first PUCCH, where the slot is used as the $k^{th}$ slot in the K slots, to prevent a resource waste.

Optionally, before step 1403, the method may further include: determining, by the terminal, slot formats of the K slots, where the slot formats of the K slots are used by the terminal to determine a quantity of symbols in each of the K slots and a symbol type.

In an implementation, the base station may send the slot formats of the K slots to the terminal, and the terminal receives the slot formats of the K slots from the base station. In an implementation, the slot formats of the K slots may be statically configured or semi-statically configured. Specifically, the base station may send the slot formats of the K slots to the terminal by using higher layer signaling, for example, radio resource control (radio resource control, RRC for short) signaling and media access control (media access control, MAC for short) signaling. In another implementation, the base station may send the slot formats of the K slots to the terminal by using dynamic signaling, for example, a group-common physical downlink control channel (Group-common physical downlink control channel, Group-common PDCCH for short).

In this case, the terminal may determine a quantity of uplink symbols or a quantity of consecutive uplink symbols in each of the K slots based on the slot formats of the K slots.

Optionally, in specific implementation, step 1403 may include: determining, by the terminal, the $i^{th}$ slot based on the at least one parameter of the first PUCCHs, and sending, in the $i^{th}$ slot, the information carried on the first PUCCH in the $k^{th}$ slot. Optionally, in specific implementation, step 1404 may include: determining, by the base station, the $i^{th}$ slot based on the at least one parameter of the first PUCCH, and receiving, in the $i^{th}$ slot, the information carried on the first PUCCH in the $k^{th}$ slot.

Specifically, after determining the $(i-r)^{th}$ slot, if determining that a quantity of uplink symbols or a quantity of consecutive uplink symbols in a slot after the $(i-r)^{th}$ slot is greater than or equal to $m_k$, the terminal may determine that the slot is the $i^{th}$ slot. The $(i-r)^{th}$ slot is used to transmit information carried on a first PUCCH in the $(k-1)^{th}$ slot in the K slots.

In an LTE system, the terminal transmits, only in an uplink subframe, information carried on a long duration PUCCH. Therefore, there is no step in which the terminal determines whether a subframe can transmit the information carried on the long duration PUCCH. However, in 5G NR, because one slot may have some uplink symbols and some downlink symbols, the terminal needs to determine whether the slot can transmit information carried on a long duration PUCCH. This step is not included in the prior art.

Optionally, a quantity of uplink symbols in the uplink symbols in the $i^{th}$ slot other than $x_4$ uplink symbols is greater than or equal to $m_k$, and $x_4$ is an integer greater than 0.

Optionally, the $x_4$ uplink symbols include but are not limited to an uplink symbol that is in the uplink symbols in the $i^{th}$ slot and that is used to transmit an SRS and/or a second format PUCCH.

In this case, after determining the $(i-r)^{th}$ slot, if determining that a quantity of uplink symbols in a slot after the $(i-r)^{th}$ slot other than $x_4$ uplink symbols is greater than or equal to $m_k$, the terminal may determine that the slot is the $i^{th}$ slot.

Optionally, the at least one parameter further indicates a start symbol number and a quantity L of symbols of a first PUCCH in the first slot in the K slots, a symbol that is in the $i^{th}$ slot and whose number is the same as the start symbol number of the first PUCCH in the first slot is an uplink symbol, L−1 symbols after the symbol that is in the $i^{th}$ slot and whose number is the same as the start symbol number of the first PUCCH in the first slot are uplink symbols, and L is an integer greater than 1.

L may be specifically an integer greater than 3. That is, the first PUCCH in the $k^{th}$ slot is a long duration PUCCH. L symbols in the $i^{th}$ slot may be L consecutive or inconsecutive symbols.

In this optional manner, the base station may send at least two of the start symbol number, a quantity of symbols, and an end symbol number of the first PUCCH in the first slot by using signaling.

The foregoing method provided in this embodiment of this application may be applied to a time division duplexing (time division duplexing, TDD for short) system, or may be applied to a frequency division duplexing (frequency division duplexing, FDD for short) system.

Introduction to 5G NR:

5G New Radio (5G NR) is a new topic proposed by the 3GPP organization in Release 14. In the nearly 10 years that have elapsed, an LTE standard proposed by the 3GPP organization has been widely used worldwide, and is referred to as a 4G communications technology. For example, China Mobile, China Unicorn, and China Telecom all use 4G LTE TDD and FDD transmission technologies, and provide a high-speed and convenient mobile network service for a user.

However, as a next-generation 5G technology enters a discussion phase, there is a problem of whether a system structure and an access process that have been standardized in 4G LTE continue to be adopted. On the one hand, because a communications system is backward compatible, a new technology developed later tends to be compatible with a previously standardized technology. On the other hand, because there is a large quantity of existing designs in 4G LTE, to achieve compatibility, flexibility of 5G is inevitably sacrificed to a large extend, thereby reducing performance. Therefore, currently, researches in two directions are conducted in parallel in the 3GPP organization, and a technical discussion group in which backward compatibility is not considered is referred to as 5G NR.

Slot format:

A slot is used as a scheduling unit in 5G NR. One slot may include 14 symbols. Specifically, a use of each symbol may be an uplink resource, a downlink resource, an idle resource, an unknown resource, or a reserved resource. A symbol whose use is an idle resource is a symbol whose use is not indicated. A resource having an "unknown" use is a redundant design created to support a plurality of service types, and a symbol whose use is a reserved resource is designed to support switching between service types or a plurality of types of transmission. Each symbol may have various uses. A structure of one slot includes a combination of a plurality of symbols having various uses. For example, in one slot, the first three symbols may be downlink symbols, and the last 10 symbols may be uplink symbols. Several common structures include an uplink-only structure (to be specific, all 14 symbols are uplink), a downlink-only structure (to be specific, all 14 symbols are downlink), and a partial-downlink and partial-uplink structure (to be specific, sonic symbols are downlink, and the other symbols are uplink).

The base station transmits the slot format to the terminal by using higher layer signaling (RRC signaling and MAC signaling) or dynamic signaling (Group-common PDCCH).

Uplink control channel PUCCH:

In 5G NR, the uplink control channel is used to carry uplink control information such as an ACK/a NACK and CQI feedback. The uplink control channel includes a short duration uplink control channel and a long duration uplink control channel. The short duration uplink control channel may occupy one or two orthogonal frequency division multiplexing (orthogonal frequency division multiplexing, OFDM) symbols in time domain. The long duration uplink control channel may occupy four to 14 OFDM symbols in time domain in one slot. In some scenarios, to improve a coverage area, the long duration uplink control channel may be transmitted in a plurality of slots, and transmission duration is the same in each slot.

Technical Solution in the Prior Art

In an existing LTE system, there is a design in which a PUCCH is carried on a plurality of subframes. Specifically, the base station configures, by using higher layer signaling, a quantity of slots in which the PUCCH is repeatedly transmitted, and schedules, in an uplink subframe, UE to transmit the PUCCH. In the LTE system, the PUCCH can be transmitted only in the uplink subframe, and the uplink subframe is a subframe in which all symbols in the subframe are uplink symbols. In this case, the PUCCH is carried on a same quantity of symbols in each uplink subframe, and the PUCCH is carried at a fixed symbol location. To be specific, the PUCCH covers the first symbol to the last symbol of each uplink subframe. In a current discussion, in a possible extension form, the PUCCH is carried at a fixed symbol location in each slot, to implement multislot PUCCH transmission.

A subframe in LTE and a slot in NR each are described as a time domain scheduling unit. Specifically, duration of the subframe in LTE is the same as duration of a slot in a case of a 15 kHz subcarrier spacing in NR. A slot concept is introduced in NR to facilitate description of scheduling in a case of a plurality of subcarrier spacings.

Disadvantages in the Prior Art

In the prior art, a fixed location is used as a time domain resource of a long PUCCH. However, in 5G NR, a slot structure changes frequently, and it is relatively difficult to require that there is resources at a fixed location in each slot to carry a long PUCCH. For example, if a multislot long PUCCH is carried on the fixed fifth to twelfth symbols in a slot, the fifth to twelfth symbols in each slot that carries the multislot long PUCCH need to be uplink symbols. However, actually, one slot can carry the long PUCCH provided that there are eight uplink symbols in the slot. It can be learned from the foregoing analysis that the slot format is clearly required for transmission performed at a fixed location, thereby wasting a large quantity of slots in which there are enough uplink symbols but the uplink symbols are not located at the fixed location.

In LTE, a PUCCH repetition is repeatedly transmitted only in an uplink subframe, and a long PUCCH in NR may be transmitted in a plurality of slot formats. In this case, two problems need to be resolved. In a first problem, whether a slot format can carry a long PUCCH needs to be determined. This problem occurs only in a TDD system. To be specific, on a same frequency domain resource, some time domain resources are used as uplink transmission resources, and some time domain resources are used as downlink transmission resources. In an FDD system, this problem does not exist when one frequency domain resource is used only for uplink transmission or downlink transmission. In a second problem, when there are enough uplink symbols in the slot format, a further rule is required to limit a symbol on which the long PUCCH is transmitted. Otherwise, if the base station indicates a specific symbol that is in each slot and from which the long PUCCH starts to be transmitted, overheads are excessively high.

An embodiment of this application provides a method for implementing a multislot long PUCCH in a TDD case.

(1) First, for a problem of whether a slot format can carry the long PUCCH, this application provides a determining method on a terminal side, and provides method details in a plurality of embodiments.

(2) Second, for a symbol that carries the long PUCCH, this application provides a rule for determining a start symbol in a slot, including determining a start symbol of the long PUCCH based on a relative location in an uplink symbol range or locations of the long PUCCH in adjacent slots.

In a solution in this embodiment of this application, a method for implementing a multislot long PUCCH is provided.

In Solution 1, a method for determining, by a terminal side, whether a slot can support a long PUCCH repetition is provided. In Solution 2, a rule for determining, by the terminal, a symbol that is in a slot and on which the long PUCCH is to be transmitted.

In Solution 1, the terminal determines whether the slot can carry the long PUCCH.

In LTE in the prior art, the terminal transmits a long PUCCH only in an uplink subframe. Therefore, there is no step in which the terminal determines whether a subframe can carry the long PUCCH. However, in 5G NR, because one slot may have some uplink symbols and some downlink symbols, the terminal needs to determine whether the slot can carry a long PUCCH repetition. This step is not included in the prior art.

Specifically, the following steps are included.

Step 1: The terminal receives instruction signaling sent by the base station, where the instruction signaling instructs the terminal to send a multislot long PUCCH and a parameter of the multislot long PUCCH.

Step 2: The terminal determines whether a slot n can carry the long PUCCH. If the slot n can carry the long PUCCH, the terminal transmits the long PUCCH in the slot; or if the slot n cannot carry the long PUCCH, the terminal determines whether a next slot can carry the long PUCCH.

In specific implementation, step 2 may be implemented by using step 2-1. Step 2-1 includes: determining, by the terminal based on a slot format and the parameter of the long PUCCH, whether the slot n can carry the long PUCCH.

In a possible implementation, the terminal determines, based on a length of the long PUCCH in the slot and a quantity of available uplink symbols in the slot n, whether the slot n can carry the long PUCCH. If the length of the long PUCCH in the slot is less than or equal to the quantity of available uplink symbols in the slot n, it is determined that the slot n can carry the long PUCCH; otherwise, the slot n cannot carry the long PUCCH. Optionally, the quantity of available uplink symbols is obtained by subtracting x from a total quantity of consecutive uplink symbols in the slot n, where x is an uplink symbol for another use. For example, when LTE and NR coexist, the uplink symbol for another use is a symbol occupied by an LTE SRS (a sounding reference signal), or a quantity of symbols occupied when the terminal transmits an SRS in the slot when LTE and NR coexist.

In another possible implementation, the terminal determines a function of a symbol location that is indicated by the base station and that is covered by the long PUCCH. If all symbols are uplink symbols, the slot may carry the long PUCCH; otherwise, the slot cannot carry the long PUCCH.

Embodiment 1: The Terminal Determines, Based on a Quantity of Consecutive Uplink Symbols, Whether a Slot Can Carry a Long PUCCH Embodiment 1 is a specific embodiment of step 2-1 in Solution 1, and whether a total quantity of consecutive uplink symbols is greater than or equal to a quantity of symbols occupied by the long PUCCH in a slot is used as a determining basis.

Figure 15:
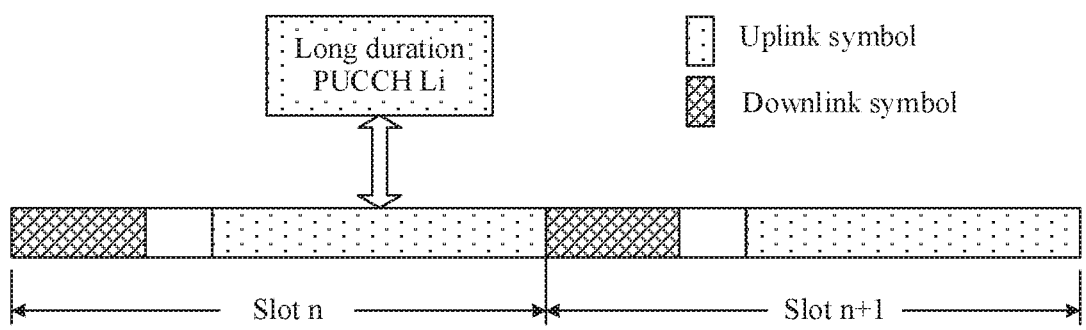
FIG. 15 to FIG. 21 are respectively schematic diagrams of a PUCCH sending location according to an embodiment of this application.

Lengths of a multislot long PUCCH in y slots are respectively L1, L2, ..., and Ly. The terminal determines whether the $n^{th}$ slot can carry the $i^{th}$ long PUCCH repetition of the multislot long PUCCH, and the $i^{th}$ long PUCCH repetition occupies Li symbols. The terminal obtains a slot structure of the $n^{th}$ slot, to obtain a quantity of consecutive uplink symbols in the slot structure. If the quantity of consecutive uplink symbols is greater than Li, the terminal transmits the $i^{th}$ long PUCCH repetition in the slot; otherwise, the terminal continues to determine whether a next slot can carry the $i^{th}$ long PUCCH repetition, and so on. For details, refer to FIG. 15.

Embodiment 2: When LTE and NR Coexist, the Terminal Determines, Based on a Quantity of Available Uplink Symbols, Whether a Slot Can Carry a Long PUCCH Embodiment 2 is a specific embodiment of step 2-1 in Solution 1, and whether a total quantity of available uplink symbols is greater than or equal to a quantity of symbols occupied by the long PUCCH in a slot is used as a determining basis.

Figure 16:
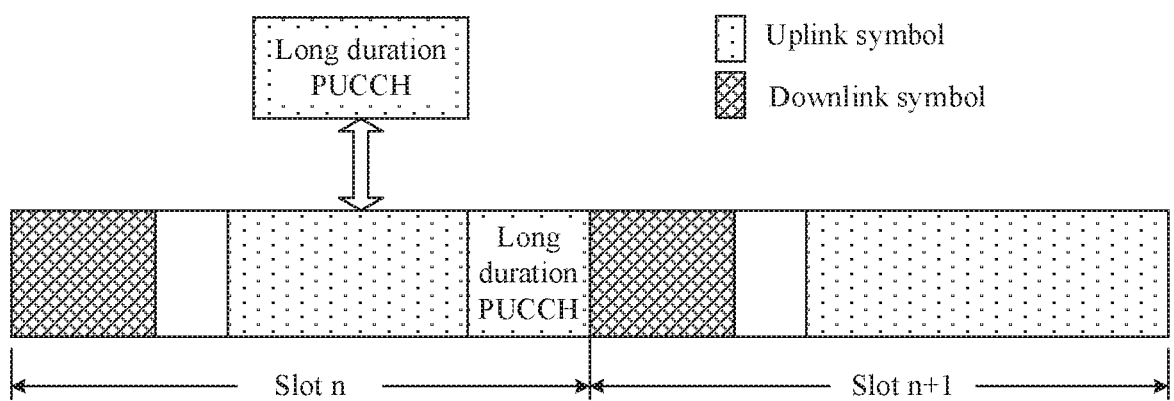

When LTE and NR coexist, LTE and NR may share a same frequency band. In this case, an NR terminal needs to exclude some symbols occupied by LTE, these symbols may be used for LTE SRS transmission, and so on. In addition, the NR terminal needs to exclude a quantity of symbols used for uplink symbol transmission of the terminal in the slot. For example, the terminal may transmit a short duration uplink control channel or transmit other signaling. After these symbols are excluded, when a total quantity of remaining consecutive uplink symbols is greater than or equal to the quantity of symbols occupied by the long PUCCH in the slot, the terminal transmits a long PUCCH repetition in the slot; otherwise, the terminal continues to determine whether a next slot can carry the long PUCCH repetition, and so on. For example, refer to FIG. 16.

Embodiment 3: The Terminal Determines Whether a Long PUCCH Can be Carried at a Fixed Location of a Slot Embodiment 3 is a specific embodiment of step 2-1 in Solution 1, and whether all symbols at fixed locations of the long PUCCH that are allocated by the base station are available uplink symbols is used as a determining basis.

Figure 17:
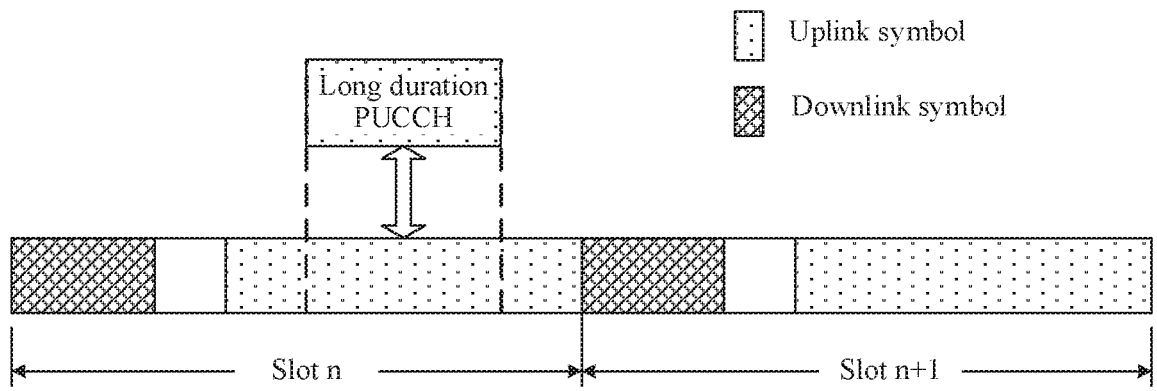

The base station sends at least two of a start symbol, a quantity of symbols, and an end symbol of the long PUCCH by using signaling, and the terminal determines, in each slot, whether all symbols at symbol locations covered by the long PUCCH are uplink symbols. For example, the base station instructs the terminal to transmit the long PUCCH on the fifth to tenth symbols in the slot, and the terminal obtains a slot structure of the $n^{th}$ slot. If all the fifth to tenth symbols in the slot structure are uplink symbols, the terminal transmits a long PUCCH repetition in the $n^{th}$ slot; otherwise, the terminal continues to determine whether the $(n+1)^{th}$ slot meets a requirement. For example, refer to FIG. 17.

Solution 2: The terminal determines a start symbol in an uplink symbol that is used to transmit the long PUCCH in the slot.

In Solution 1, a method for determining, by the terminal, whether one slot can carry a long PUCCH repetition is provided. After determining that a slot has sufficient resources to carry the long PUCCH, the terminal needs to determine a resource that is of the slot and on which the long PUCCH is transmitted. This involves determining of the start symbol of the long PUCCH. For example, the long PUCCH repetition occupies eight symbols, but one slot has 10 uplink symbols. How to determine a symbol in the 10 symbols that is used to carry the long PUCCH is a problem to be resolved in Solution 2.

It should be noted that, if a finally implemented standard specifies that or the base station notifies that the long PUCCH is carried at a same location in each slot, there is no problem of determining the start symbol.

In configuration signaling of a multislot long PUCCH, a quantity of slots is variable, and there needs to be a start symbol number in each slot, separately indicating that start symbols of all slots increase a large quantity of signaling overheads. However, a fixed location in the prior art has a strict requirement on a slot format.

In the solution of this application, a relative location in an uplink symbol range in a slot is used as a basis for determining a start symbol, and is reflected in a standard. When transmitting the multislot long PUCCH, the terminal determines a location of the long PUCCH based on the relative location within the uplink symbol range, and transmits the long PUCCH.

There are a plurality of possibilities of relative locations in the uplink symbol. For a long PUCCH having a time domain length Li (I>1, to be specific, the following rule is used starting from the second slot of the multislot long PUCCH), in a possible implementation, the first symbol and Li–1 subsequent symbols in an uplink symbol range are used as time domain resources of the long PUCCH; in a possible implementation, the last symbol and Li–1 preceding symbols in an uplink symbol range are used as time domain resources of the long PUCCH; and in a possible implementation, the long PUCCH is transmitted on a symbol of the $x^{th}$ symbol and Li–1 subsequent symbols in the uplink symbol range, or the long PUCCH is transmitted on a symbol of the last-but-(x–1) symbol and Li–1 preceding symbols in the uplink symbol range.

In another possible implementation, two frequency hopping parts of the long PUCCH are separately limited. A start symbol of a first frequency hopping part is located on the first symbol in an uplink symbol range or a symbol of the $x^{th}$ symbol in the uplink symbol range; and an end symbol of a second frequency hopping part is located on the last symbol in an uplink symbol range or a symbol of the last-but-(y–1) symbol in the uplink symbol range. This manner is relatively complex, and is not described in detail in a subsequent specific embodiment.

In another possible implementation, a relative location of a multislot long PUCCH is considered. An end symbol of a long PUCCH in one slot is located at the last symbol in an uplink symbol range, and a start symbol of a long PUCCH in another subsequent slot is located at the first symbol in an uplink symbol range. In this way, an interval between two long PUCCHs is relatively small in time domain. An advantage is that a channel measurement result of a long PUCCH in a previous slot can assist channel measurement of a long PUCCH in a next slot, thereby improving performance. The foregoing describes two slots. For a case in which there are more than two slots, one manner is that transmission is performed in every two slots in the foregoing method, and the other manner is that an end symbol of a long PUCCH in the first slot in a plurality of slots is located at the last symbol in an uplink symbol range, and a start symbol of a long PUCCH in the last slot in the plurality of slots is located at the first symbol in the uplink symbol range.

Embodiment 4: The Terminal Determines, in the Second Slot and a Subsequent Slot, that the First Uplink Symbol is a Start Symbol in Uplink Symbols Used to Transmit a Long PUCCH In this case, it may be specified in a 5G standard that in the second slot and a subsequent slot of a multislot long PUCCH, the first uplink symbol in each slot is used as a resource of the long PUCCH.

Figure 18:
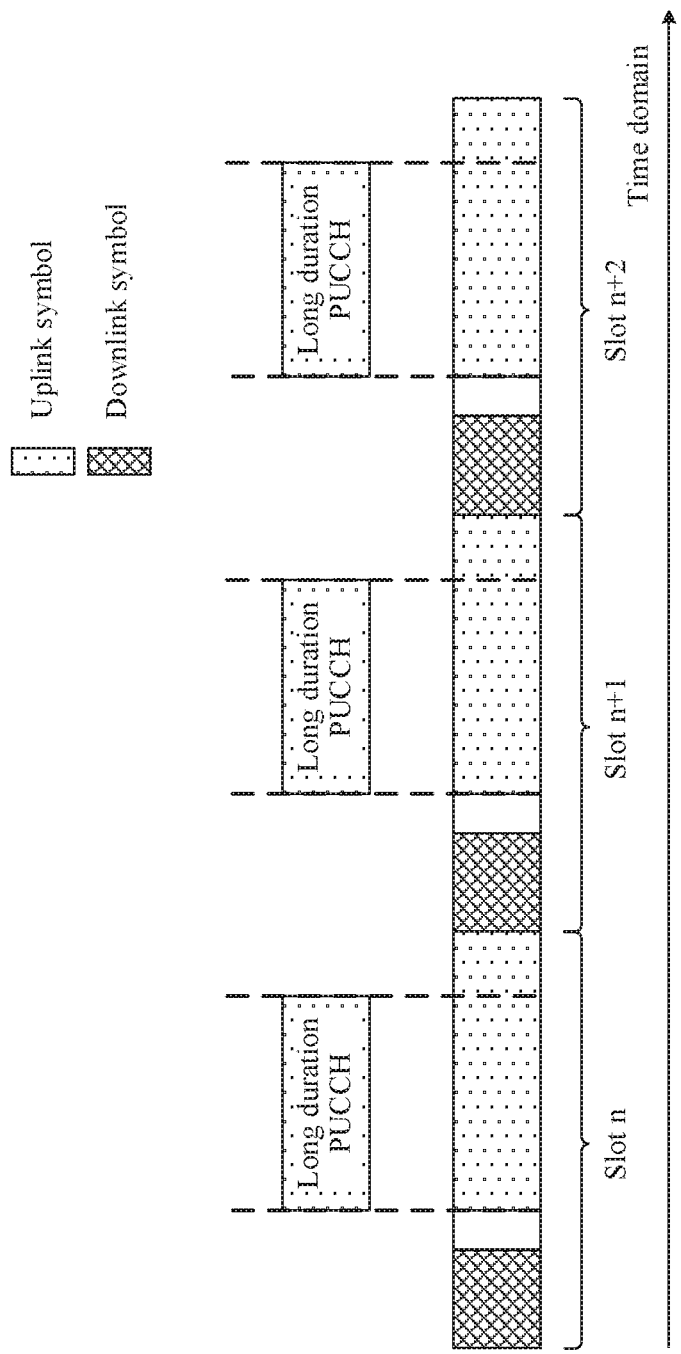

As shown in FIG. 18, the terminal transmits a multislot long PUCCH. A slot n is used as the second slot of the multislot long PUCCH, and a start symbol of the long PUCCH is the first symbol in an uplink symbol range of the slot n. A slot n+1 is used as the third slot of the multislot long PUCCH, and a start symbol of the long PUCCH is the first symbol in an uplink symbol range of the slot n+1. A slot n+2 is used as the fourth slot of the multislot long PUCCH, and a start symbol of the long PUCCH is the first symbol in an uplink symbol range of the slot n+2.

Embodiment 5: The Terminal Determines, in the Second Slot and a Subsequent Slot, that the Last Uplink Symbol is a Start Symbol in Uplink Symbols Used to Transmit a Long PUCCH In this case, it may be specified in a 5G standard that in the second slot and a subsequent slot of a multislot long PUCCH, the last uplink symbol in each slot is used as a resource of the long PUCCH.

Figure 19:
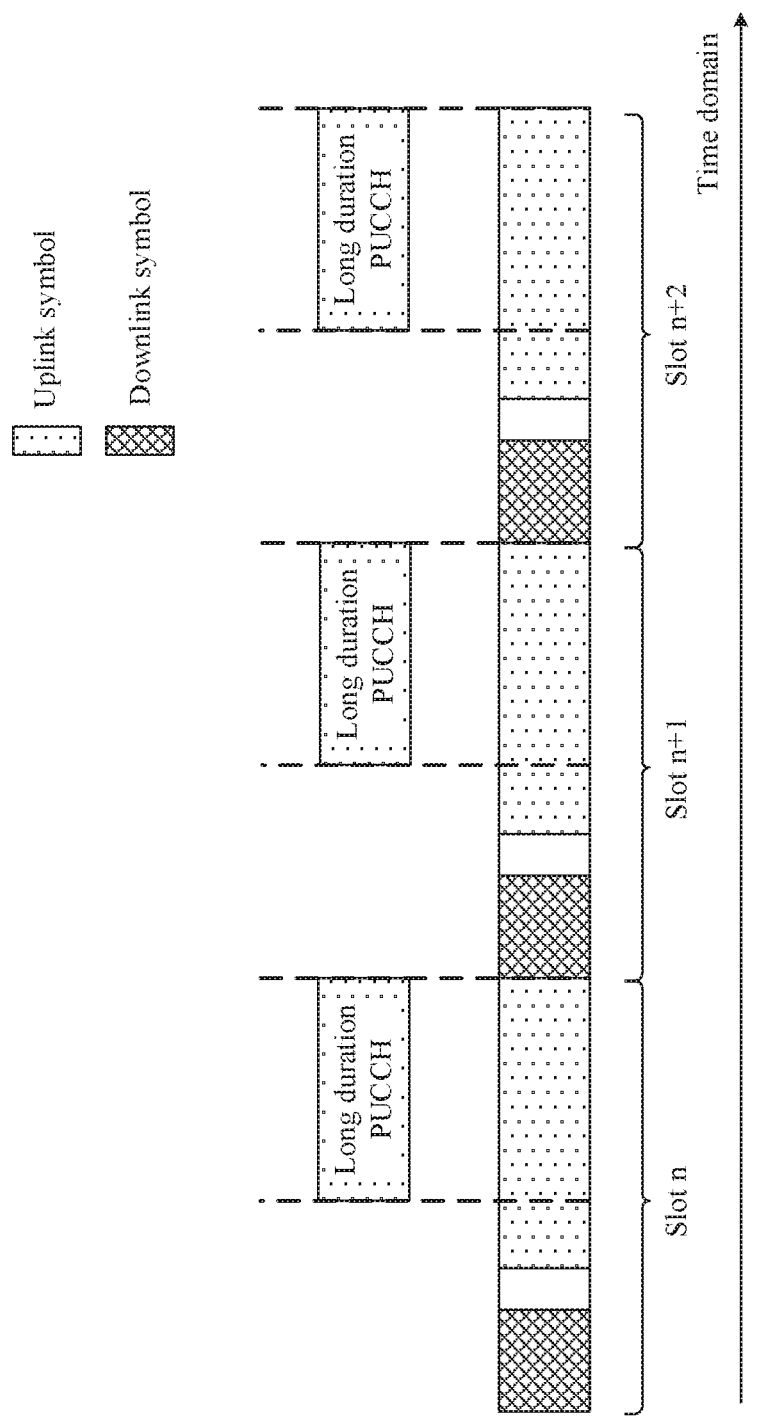

As shown in FIG. 19, the terminal transmits a multislot long PUCCH. A slot n is used as the second slot of the multislot long PUCCH, and an end symbol of the long PUCCH is the last symbol in an uplink symbol range of the slot n. A slot n+1 is used as the third slot of the multislot long PUCCH, and an end symbol of the long PUCCH is the last symbol in an uplink symbol range of the slot n+1. A slot n+2 is used as the fourth slot of the multislot long PUCCH, and an end symbol of the long PUCCH is the last symbol in an uplink symbol range of the slot n+2.

Embodiment 6: The Terminal Determines, in the Second Slot and a Subsequent Slot, that the $x^{th}$ Uplink Symbol or the last-but-(x–1) Uplink Symbol is a Start Symbol in Uplink Symbols Used to Transmit a Long PUCCH In this case, it may be specified in a 5G standard that in the second slot and a subsequent slot of a multislot long PUCCH, the $x^{th}$ symbol in each slot is used as a start symbol of the long PUCCH, or a symbol of the last-but-(x–1) symbol in each slot is used as an end symbol of the long PUCCH, and x is an integer greater than 1.

Figure 20:
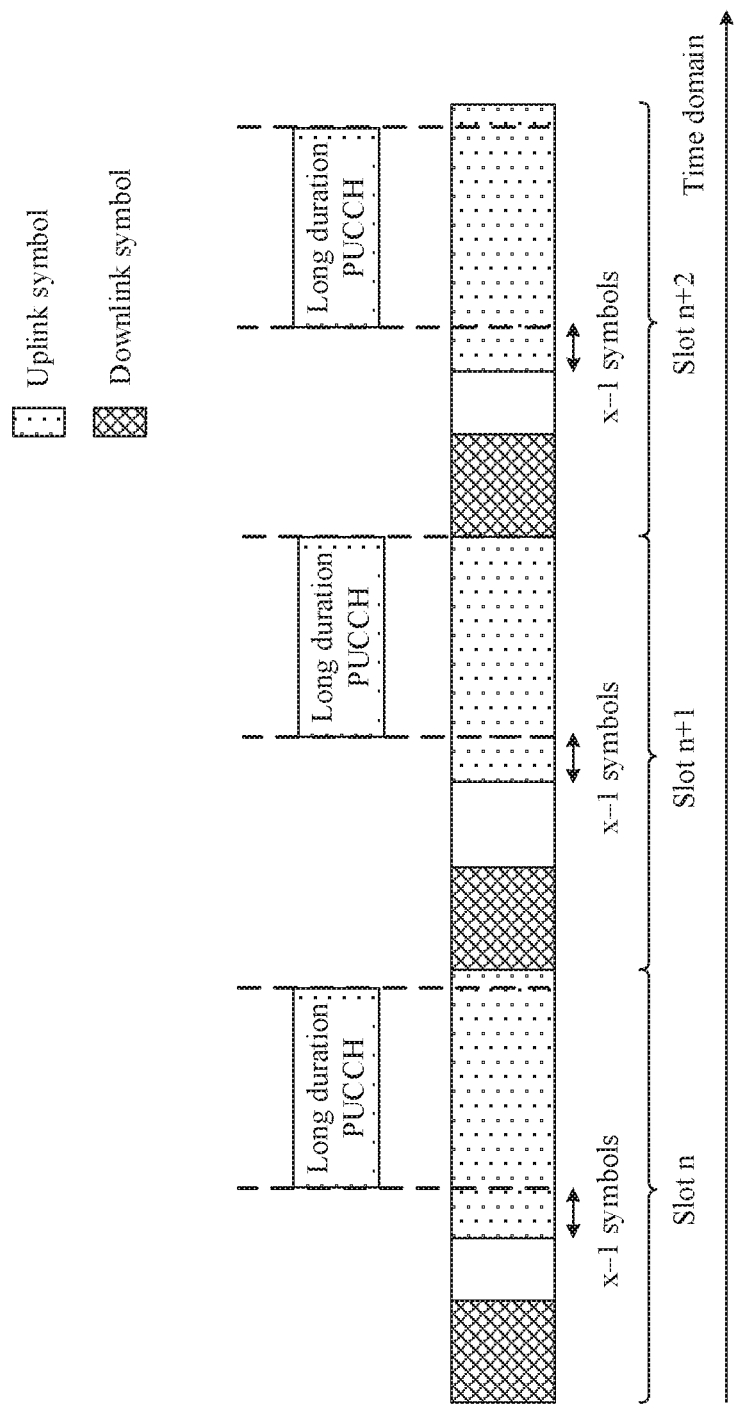

As shown in FIG. 20, the terminal transmits a multislot long PUCCH. A slot n is used as the second slot of the multislot long PUCCH, and a start symbol of the long PUCCH is the $x^{th}$ symbol in an uplink symbol range of the slot n. A slot n+1 is used as the third slot of the multislot long PUCCH, and a start symbol of the long PUCCH is the $x^{th}$ symbol in an uplink symbol range of the slot n+1. A slot n+2 is used as the fourth slot of the multislot long PUCCH, and a start symbol of the long PUCCH is the symbol in an uplink symbol range of the slot n+2.

Embodiment 7: The Terminal Determines, Based on an Uplink Symbol Used to Transmit a Long PUCCH in a Slot Adjacent to a Slot, a Start Symbol in Uplink Symbols Used to Transmit a Long PUCCH in the Slot As shown in FIG. 21, in a case of two slots, an end symbol of a long PUCCH in the first slot is the last symbol in uplink symbols in the slot, and a start symbol of a long PUCCH in the second slot is the first symbol in uplink symbols in the slot.

Figure 21:
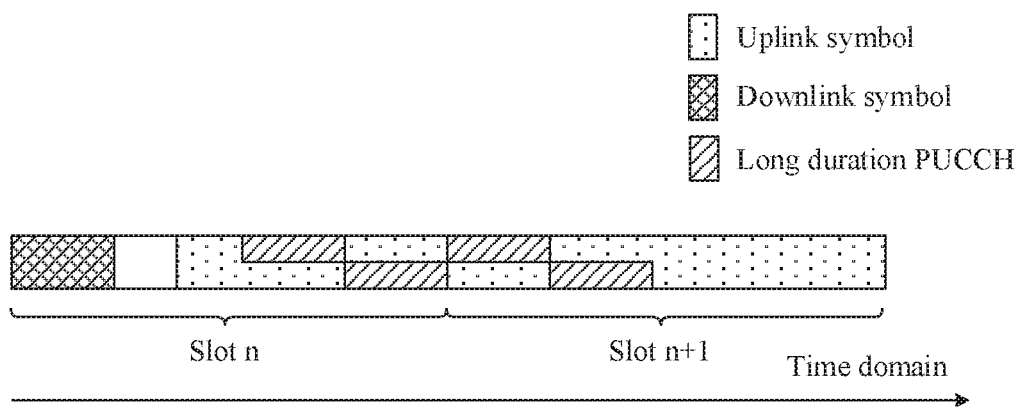

In a possible implementation, in a case of N slots, N is an integer greater than 2, and a manner shown in FIG. 21 is sequentially used every two slots. For example, refer to FIG. 21. Because two long PUCCHs are close to each other, the two long PUCCHs may share some DMRS detection results to improve performance.

In another possible implementation, for long PUCCHs in N slots, an end symbol of a long PUCCH in the second slot is the last symbol in uplink symbols in the slot, and a start symbol of a long PUCCH in the $N^{th}$ slot is the first symbol in uplink symbols in the slot.

According to the manner provided in this embodiment of this application, a multislot long uplink control channel resource allocation method is provided, and relates to whether a slot has a resource to carry a long uplink control channel and a time domain resource on which the long uplink control channel is located in the slot.

In this application, the solutions provided in the embodiments of this application are mainly described from a perspective of the method. It can be understood that, to implement the foregoing functions, the terminal and/or the base station includes corresponding hardware structures and/or software modules for performing the functions. A person of skilled in the art should easily be aware that, in combination with the examples described in the embodiments disclosed in this specification, units, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal and/or the base station may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in this embodiment of this application, division into modules is an example, and is merely a logical function division. In actual implementation, another division manner may be used.

Figure 22:
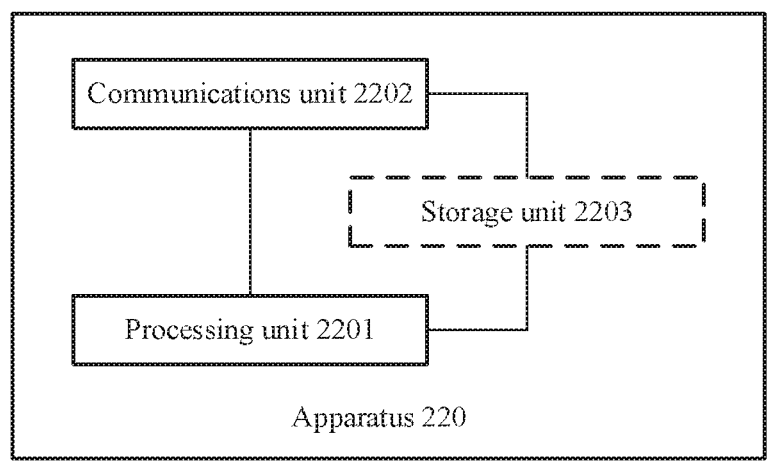
FIG. 22 is a schematic diagram of a composition of an apparatus according to an embodiment of this application.

For example, FIG. 22 is a possible schematic structural diagram of an apparatus 220 in the foregoing embodiment. The apparatus 220 includes a processing unit 2201 and a communications unit 2202, and may further include a storage unit 2203. The apparatus 220 may be a terminal or a base station.

When the apparatus 220 is a terminal, the processing unit 2201 is configured to control and manage an action of the terminal. For example, the processing unit 2201 is configured to support the terminal in performing steps 201 and 203 in FIG. 2 and steps 1402 and 1403 in FIG. 14, and/or an action performed by the terminal in another process described in the embodiments of this application. The communications unit 2202 is configured to support the terminal in communicating with another network entity, for example, communicating with the base station shown in FIG. 2. The storage module 2203 is configured to store program code and data of the terminal.

When the apparatus 220 is a base station, the processing unit 2201 is configured to control and manage an action of the base station. For example, the processing unit 2201 is configured to support the base station in performing steps 202 and 204 in FIG. 2 and steps 1401 and 1404 in FIG. 14, and/or an action performed by the base station in another process described in the embodiments of this application. The communications unit 2202 is configured to support the base station in communicating with another network entity, for example, communicating with the terminal shown in FIG. 2. The storage module 2203 is configured to store program code and data of the base station.

The processing unit 2201 may be a processor or a controller. The communications unit 2202 may be a communications interface, a transceiver, a transceiver circuit, or the like. The communications interface is a general term, and may include one or more interfaces. The storage unit 2203 may be a memory. When the processing unit 2201 is a processor, the communications unit 2202 is a communications interface, and the storage unit 2203 is a memory, the apparatus 220 in this embodiment of this application may be the network device 10 shown in FIG. 1.

When the network device 10 is a terminal, the processor 101 is configured to control and manage an action of the terminal. For example, the processor 101 is configured to support the terminal in performing steps 201 and 203 in FIG. 2 and steps 1402 and 1403 in FIG. 14, and/or an action performed by the terminal in another process described in the embodiments of this application. The communications interface 104 is configured to support the terminal in communicating with another network entity, for example, communicating with the base station shown in FIG. 2. The memory 103 is configured to store program code and data of the terminal.

When the network device 10 is a base station, the processor 101 is configured to control and manage an action of the base station. For example, the processor 101 is configured to support the base station in performing steps 202 and 204 in FIG. 2 and steps 1401 and 1404 in FIG. 14, and/or an action performed by the base station in another process described in the embodiments of this application. The communications interface 104 is configured to support the base station in communicating with another network entity, for example, communicating with the terminal shown in FIG. 2. The memory 103 is configured to store program code and data of the base station.

An embodiment of this application further provides a computer readable storage medium, including an instruction. When the instruction is run on a computer, the computer is enabled to perform the foregoing methods.

An embodiment of this application further provides a computer program product including an instruction. When the computer program product is run on a computer, the computer is enabled to perform the foregoing methods.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from one website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD for short)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, definitely, various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An information sending method, implemented by a terminal, wherein the information sending method comprises:
   receiving one or more instruction signalings from a base station, wherein the instruction signalings indicate a quantity K of slots occupied by repetitions of transmission of a first duration physical uplink control channel (PUCCH), a start symbol's number in each of the K slots, a quantity of symbols occupied by transmission of the first duration PUCCH in each of the K slots, and a slot format of each of the K slots; and
   transmitting the first duration PUCCH using an $i^{th}$ slot when the $i^{th}$ slot meets a first condition and the $i^{th}$ slot is determined by the terminal as a start slot of the K slots,
   wherein the quantity of symbols is a positive integer greater than 3,
   wherein K is a positive integer greater than 1,
   wherein the start symbol is determined based on the start symbol's number,
   wherein the consecutive available uplink symbols comprise any one available uplink symbol in the available uplink symbols adjacent to at least another available uplink symbol,
   wherein the $i^{th}$ slot is a slot after the terminal receives the instruction signalings from the base station,
   wherein the first condition is that the start symbol of the slot is an available uplink symbol and a quantity of consecutive available uplink symbols starting from the start symbol in the slot is greater than or equal to the quantity of symbols, and
   wherein i is a positive integer greater than 0.

2. The information sending method of claim 1, wherein after transmitting the first duration PUCCH, the information sending method further comprises transmitting the first duration PUCCH using an $(i+1)^{th}$ slot when the $(i+1)^{th}$ slot meets the first condition, and wherein the $(i+1)^{th}$ slot is a next slot adjacent to the $i^{th}$ slot.

3. The information sending method of claim 2, wherein when K is greater than 2 and after transmitting the first duration PUCCH, the information sending method further comprises transmitting the first duration PUCCH using an $(i+2)^{th}$ slot when the $(i+2)^{th}$ slot meets the first condition, and wherein the $(i+2)^{th}$ slot is a next slot adjacent to the $(i+1)^{th}$ slot.

4. The information sending method of claim 2, wherein when K is greater than 2 and after transmitting the first duration PUCCH, the information sending method further comprises skipping transmitting the first duration PUCCH using an $(i+2)^{th}$ slot when the quantity of consecutive available uplink symbols in the $(i+2)^{th}$ slot is less than the quantity of symbols, and wherein the $(i+2)^{th}$ slot is a next slot adjacent to the $(i+1)^{th}$ slot.

5. The information sending method of claim 1, wherein after transmitting the first duration PUCCH, the information sending method further comprises skipping transmitting the first duration PUCCH when the quantity of consecutive available uplink symbols in an $(i+1)^{th}$ slot is less than the quantity of symbols, and wherein the $(i+1)^{th}$ slot is a next slot adjacent to the $i^{th}$ slot.

6. The information sending method of claim 5, wherein when K is greater than 2 and after skipping transmitting the first duration PUCCH, the information sending method further comprises transmitting the first duration PUCCH using an $(i+2)^{th}$ slot when the $(i+2)^{th}$ slot meets the first condition, and wherein the $(i+2)^{th}$ slot is a next slot adjacent to the $(i+1)^{th}$ slot.

7. The information sending method of claim 5, wherein when K is greater than 2 and after skipping transmitting the first duration PUCCH, the information sending method further comprises skipping transmitting the first duration PUCCH using an $(i+2)^{th}$ slot when the quantity of consecutive available uplink symbols in the $(i+2)^{th}$ slot is less than the quantity of symbols, and wherein the $(i+2)^{th}$ slot is a next slot adjacent to the $(i+1)^{th}$ slot.

8. The information sending method of claim 1, wherein the slot format is configured to indicate a first purpose of each of at least some symbols in each of the K slots or a second purpose of a certain range of symbols in at least some of the symbols in each of the K slots.

9. The information sending method of claim 8, wherein the first purpose of each symbol includes uplink or downlink, or wherein the second purpose of the certain range of symbols includes uplink or downlink.

10. The information sending method of claim 1, further comprising at last the terminal finds the K slots comprising the $i^{th}$ slot.

11. The information sending method of claim 1, wherein the quantity of consecutive available uplink symbols starting from the start symbol is a quantity of consecutive uplink symbols starting from the start symbol, and wherein the instruction signalings are in a format of higher layer signaling or dynamic signaling.

12. The information sending method of claim 1, wherein the quantity of consecutive available uplink symbols starting from the start symbol is a first quantity, and wherein the first quantity is a quantity remaining after the quantity of consecutive uplink symbols starting from the start symbol excludes a quantity of uplink symbols for other purposes.

13. The information sending method of claim 1, wherein the symbols occupied by the transmission of the first duration PUCCH comprise the start symbol and starts from the start symbol, and wherein the $i^{th}$ slot is a same slot in both the terminal and the base station.

14. A terminal comprising:
a memory configured to store computer-executable instructions; and
a processor coupled to the memory and configured to execute the instructions to cause the terminal to:
receive one or more instruction signalings from a base station, wherein the instruction signalings indicate a quantity K of slots occupied by repetitions of transmission of a first duration physical uplink control channel (PUCCH), a start symbol's number in each of the K slots, a quantity of symbols occupied by transmission of the first duration PUCCH in each of the K slots, and a slot format of each of the K slots; and
transmit the first duration PUCCH using an $i^{th}$ slot when the $i^{th}$ slot meets a first condition and the $i^{th}$ slot is determined by the terminal as a start slot of the K slots, wherein the quantity of symbols is a positive integer greater than 3,
wherein K is a positive integer greater than 1,
wherein the start symbol is determined based on the start symbol's number,
wherein the consecutive available uplink symbols comprise that any one available uplink symbol in the available uplink symbols is adjacent to at least another available uplink symbol,
wherein the $i^{th}$ slot is a slot after the terminal receives the instruction signalings from the base station,
wherein the first condition is the start symbol of the slot is an available uplink symbol and a quantity of consecutive available uplink symbols starting from the start symbol in the slot is greater than or equal to the quantity of symbols, and
wherein i is a positive integer greater than 0.

15. The terminal of claim 14, wherein after transmitting the first duration PUCCH, the instructions further cause the terminal to transmit the first duration PUCCH using an $(i+1)^{th}$ slot when the $(i+1)^{th}$ slot meets the first condition, and wherein the $(i+1)^{th}$ slot is a next slot adjacent to the $i^{th}$ slot.

16. The terminal of claim 15, wherein when K is greater than 2, after transmitting the first duration PUCCH, the instructions further cause the terminal to transmit the first duration PUCCH using an $(i+2)^{th}$ slot when the $(i+2)^{th}$ slot meets the first condition, and wherein the $(i+2)^{th}$ slot is a next slot adjacent to the $(i+1)^{th}$ slot.

17. The terminal of claim 15, wherein when K is greater than 2 and after transmitting the first duration PUCCH, the instructions further cause the terminal to skip transmitting the first duration PUCCH using an $(i+2)^{th}$ slot when the quantity of consecutive available uplink symbols in the $(i+2)^{th}$ slot is less than the quantity of symbols, and wherein the $(i+2)^{th}$ slot is a next slot adjacent to the $(i+1)^{th}$ slot.

18. The terminal of claim 14, wherein after transmitting the first duration PUCCH, the instructions further cause the terminal to skip transmitting the first duration PUCCH when the quantity of consecutive available uplink symbols in a $(i+1)^{th}$ slot is less than the quantity of symbols, and wherein the $(i+1)^{th}$ slot is a next slot adjacent to the $i^{th}$ slot.

19. The terminal of claim 18, wherein when K is greater than 2 and after skipping transmitting the first duration PUCCH, the instructions further cause the terminal to transmit the first duration PUCCH using an $(i+2)^{th}$ slot when the $(i+2)^{th}$ slot meets the first condition, and wherein the $(i+2)^{th}$ slot is a next slot adjacent to the $(i+1)^{th}$ slot.

20. The terminal of claim 18, wherein when K is greater than 2, after skipping transmitting the first duration PUCCH, the instructions further cause the terminal to skip transmitting the first duration PUCCH using an $(i+2)^{th}$ slot when the quantity of consecutive available uplink symbols in the $(i+2)^{th}$ slot is less than the quantity of symbols, and wherein the $(i+2)^{th}$ slot is a next slot adjacent to the $(i+1)^{th}$ slot.

* * * * *